United States Patent
Bonola

(10) Patent No.: US 9,032,128 B2
(45) Date of Patent: May 12, 2015

(54) METHOD AND SYSTEM FOR GENERATING AND DELIVERING INTER-PROCESSOR INTERRUPTS IN A MULTI-CORE PROCESSOR AND IN CERTAIN SHARED MEMORY MULTI-PROCESSOR SYSTEMS

(75) Inventor: Thomas J. Bonola, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1010 days.

(21) Appl. No.: 12/988,459

(22) PCT Filed: Apr. 28, 2008

(86) PCT No.: PCT/US2008/005447
§ 371 (c)(1),
(2), (4) Date: Oct. 18, 2010

(87) PCT Pub. No.: WO2009/134217
PCT Pub. Date: Nov. 5, 2009

(65) Prior Publication Data
US 2011/0047310 A1    Feb. 24, 2011

(51) Int. Cl.
*G06F 13/24* (2006.01)
*G06F 13/32* (2006.01)
*G06F 9/48* (2006.01)

(52) U.S. Cl.
CPC .............. *G06F 13/24* (2013.01); *G06F 9/4812* (2013.01)

(58) Field of Classification Search
CPC ....... G06F 13/24; G06F 9/4812; G06F 9/546; G06F 13/26; G06F 15/17; G06F 9/45533; G06F 9/4818; G06F 9/32; H04L 49/901
USPC ............................ 710/260–269; 709/213–216
See application file for complete search history.

(56) References Cited

U.S. PATENT DOCUMENTS

| | | | | |
|---|---|---|---|---|
| 4,365,294 A | * | 12/1982 | Stokken | 713/502 |
| 4,797,815 A | * | 1/1989 | Moore | 710/109 |
| 5,136,714 A | * | 8/1992 | Braudaway et al. | 710/260 |
| 5,142,683 A | * | 8/1992 | Burkhardt et al. | 709/215 |
| 5,428,799 A | * | 6/1995 | Woods et al. | 710/266 |
| 5,481,731 A | * | 1/1996 | Conary et al. | 711/141 |

(Continued)

FOREIGN PATENT DOCUMENTS

KR    10-2006-0121266    11/2006

OTHER PUBLICATIONS

Structured Computer Organization by Andrew S. Tanenbaum, 3rd edition, pp. 11-13, 5 pages.*

(Continued)

*Primary Examiner* — Faisal M Zaman
(74) *Attorney, Agent, or Firm* — Olympic Patent Works PLLC

(57) ABSTRACT

Certain embodiments of the present invention are directed to providing efficient and easily-applied mechanisms for inter-core and inter-processor communications and inter-core and inter-processor signaling within multi-core microprocessors and certain multi-processor systems. In one embodiment of the present invention, local advanced programmable interrupt controllers within, or associated with, cores of a multi-core microprocessor and/or processors of a multi-processor system are enhanced so that the local advanced programmable interrupt controllers can be configured to automatically generate inter-core and inter-processor interrupts when WRITE operations are directed to particular regions of shared memory.

15 Claims, 19 Drawing Sheets

(56) References Cited

U.S. PATENT DOCUMENTS

| | | | | |
|---|---|---|---|---|
| 5,617,576 | A | * | 4/1997 | Solari et al. ............... 712/40 |
| 5,724,549 | A | * | 3/1998 | Selgas et al. ............... 711/141 |
| 5,751,641 | A | * | 5/1998 | Petrosino ............... 365/189.05 |
| 5,787,270 | A | * | 7/1998 | Bloomer et al. ............... 714/6.13 |
| 5,887,164 | A | * | 3/1999 | Gupta ............... 713/2 |
| 5,894,587 | A | * | 4/1999 | Normoyle et al. ............... 710/310 |
| 5,923,887 | A | * | 7/1999 | Dutton ............... 710/260 |
| 6,145,007 | A | * | 11/2000 | Dokic et al. ............... 709/230 |
| 6,148,361 | A | * | 11/2000 | Carpenter et al. ............... 710/260 |
| 6,370,606 | B1 | * | 4/2002 | Bonola ............... 710/260 |
| 6,389,498 | B1 | * | 5/2002 | Edwards et al. ............... 710/268 |
| 6,434,630 | B1 | * | 8/2002 | Micalizzi et al. ............... 710/5 |
| 6,715,042 | B1 | * | 3/2004 | Mirza et al. ............... 711/151 |
| 6,779,065 | B2 | * | 8/2004 | Murty et al. ............... 710/260 |
| 6,968,412 | B1 | * | 11/2005 | Nalawadi ............... 710/261 |
| 6,987,961 | B1 | * | 1/2006 | Pothana ............... 455/412.1 |
| 6,990,659 | B1 | * | 1/2006 | Imai ............... 717/171 |
| 7,289,823 | B1 | * | 10/2007 | Kumar et al. ............... 455/550.1 |
| 7,336,700 | B2 | * | 2/2008 | Andre et al. ............... 375/219 |
| 7,765,351 | B2 | * | 7/2010 | Nsame et al. ............... 710/244 |
| 7,979,861 | B2 | * | 7/2011 | Todoroki et al. ............... 718/103 |
| 8,214,574 | B2 | * | 7/2012 | Chinya et al. ............... 710/260 |
| 8,285,904 | B2 | * | 10/2012 | Strauss et al. ............... 710/268 |
| 2001/0052043 | A1 | * | 12/2001 | Pawlowski et al. ............... 710/260 |
| 2003/0046464 | A1 | | 3/2003 | Murty et al. |
| 2004/0024744 | A1 | * | 2/2004 | Yamada ............... 707/1 |
| 2004/0068598 | A1 | * | 4/2004 | Sakugawa ............... 710/260 |
| 2004/0073910 | A1 | * | 4/2004 | Hokenek et al. ............... 719/310 |
| 2005/0021914 | A1 | | 1/2005 | Chung |
| 2005/0154810 | A1 | * | 7/2005 | Chong et al. ............... 710/200 |
| 2006/0155907 | A1 | * | 7/2006 | Yoshida et al. ............... 710/260 |
| 2007/0180310 | A1 | | 8/2007 | Johnson et al. |
| 2008/0126651 | A1 | * | 5/2008 | Andre et al. ............... 710/267 |
| 2008/0307275 | A1 | * | 12/2008 | Wong et al. ............... 714/719 |
| 2009/0182954 | A1 | * | 7/2009 | Mejdrich et al. ............... 711/141 |
| 2010/0191887 | A1 | * | 7/2010 | Serebrin ............... 710/267 |
| 2010/0223611 | A1 | * | 9/2010 | Mahalingam et al. ............... 718/1 |
| 2011/0191543 | A1 | * | 8/2011 | Craske et al. ............... 711/131 |
| 2011/0246696 | A1 | * | 10/2011 | Alapati et al. ............... 710/269 |
| 2012/0036298 | A1 | * | 2/2012 | Lais et al. ............... 710/260 |
| 2012/0131249 | A1 | * | 5/2012 | Cepulis et al. ............... 710/269 |

OTHER PUBLICATIONS

"NA9406201: Volume Status Change", Jun. 1, 1994, IBM, IBM Technical Disclosure Bulletin, vol. 37, Iss. 6A, pp. 201-202.*

"NN9302467: I/O Interruption Priority for ESA/390", Feb. 1, 1993, IBM, IBM Technical Disclosure Bulletin, vol. 36, Iss. 2, pp. 467-470.*

International Search Report and Written Opinion, dated Dec. 24, 2008, 11 pages.

* cited by examiner

| Register | Address |
|---|---|
| Local APIC ID Register | FEE0_0020 |
| Local APIC Version Register | FEE0_0030 |
| Task Priority Register | FEE0_0080 |
| Processor Priority Register | FEE0_00A0 |
| EOI Register | FEE0_00B0 |
| Logical Destruction Register | FEE0_00D0 |
| Spurious Interrupt Vector Register | FEE0_00F0 |
| In-Service Register | FEE0_0100 – FEE0_0170 |
| Trigger Mole Register | FEE0_0180 – FEE0_01F0 |
| Interrupt Request Register | FEE0_0200 – FEE0_0270 |
| Error Status Register | FEE0_0280 |
| Interrupt Command Register | FEE0_0300 / FEE0_0310 |
| LVT Timer Register | FEE0_0320 |
| LVT Thermal Sensor Register | FEE0_0330 |
| LVT Performance Monitoring Register | FEE0_0340 |
| LVT LINT0 Register | FEE0_0350 |
| LVT LINT1 Register | FEE0_0360 |
| LVT Error Register | FEE0_0370 |
| Initial Count Register | FEE0_0380 |
| Current Count Register | FEE0_0390 |
| Divide Configuration Register | FEE0_03E0 |
| | FEE0_0400 |
| | FEE0_0410 |
| | FEE0_0420 |
| | FEE0_0430 |

Figure 6

IMR[7:0] – Vector
This field contains the 8-bit vector number of the interrupt being issued.

IMR[10:8] – Fixed Delivery Mode (000b)

IMR[11] – DM (Destination Mode)
0:   Physical
1:   Logical

IMR[12] – DS (Delivery Status)
0:   Idle
1:   IPI pending
This field has the same semantics as the Delivery Status field in the ICR. Software will not poll this bit during normal operation since the IPI is always issued at the same interrupt vector. Back-to-back writes to the shared-memory region will generate IPI messages only when the target processor can accept them. Otherwise, successive writes to the registered memory will result in natural interrupt coalescing for the given vector. This field is useful when software decides to remap the IMR with new address and vector information.

IMR[13] – EN (Enable IMR)
0:   Disable
1:   Enable

IMR[15:14] – Reserved

IMR[16] – FW (Firmware)
0:   This IMR is available to the host operating system or hypervisor
1:   This IMR is available only to the system firmware

IMR[17] – Reserved

IMR[19:18] – DS (Destination Shorthand)
00:   No shorthand
01:   Self
10:   All including self
11:   All excluding self

IMR[31:20] – Reserved

IMR[55:32] – Page Count
This 24-bit field specifies the number of consecutive pages that comprise the shared-memory region, starting from the page specified in the Page field.

IMR[63:56] – Destination
This field has the same semantics as the Destination field in the ICR.

IMR[75:64] – Reserved

IMR[127:76] – Page
   This field specifies the starting 4K-byte physical page address in shared memory.

Figure 13

METHOD AND SYSTEM FOR GENERATING AND DELIVERING INTER-PROCESSOR INTERRUPTS IN A MULTI-CORE PROCESSOR AND IN CERTAIN SHARED MEMORY MULTI-PROCESSOR SYSTEMS

TECHNICAL FIELD

The present invention is related to processor architectures, inter-core communications, inter-processor communications, and interrupt mechanisms and, in particular, to an enhanced advanced programmable interrupt controller that can be configured to generate inter-processor interrupts when WRITE operations are directed to particular regions of shared memory.

BACKGROUND OF THE INVENTION

The speed by which microprocessors execute instructions, and the overall instruction-execution throughput of microprocessors, has increased exponentially during the initial decades of computer evolution. However, as microprocessor designers approach what appear to be significant physical limitations to further decreasing the sizes of signal lines, transistors, and other components, or features, of integrated circuits, as power dissipation problems have increased with increasing processor speeds, and because the speed at which memory can be accessed has not increased at nearly the rate at which processor speeds have increased, continued exponential increase in processor speeds appears to be improbable. However, demands for ever-increasing instruction-execution throughput continue unabated as demand for computational throughput continue to increase, due to increased automation of human activities and commercial tasks as well as the many new and emerging computer-related environments and activities, from Internet-based commerce and content delivery to social networking and virtual worlds. As a result, designers and manufacturers of microprocessors continue to seek strategies for increasing the instruction-execution throughput of microprocessors despite the above-mentioned constraints and limitations.

One strategy for increasing the instruction-execution throughput of microprocessors is to include multiple processor cores, essentially multiple instruction-execution engines, within a single microprocessor integrated circuit. Multi-core microprocessors, particularly when hyperthreaded, provide potentially large increases in instruction-execution throughput by allowing for simultaneous execution of multiple execution threads and/or processes. As one example, portions of the processing tasks associated with high-bandwidth communications may be executed on one core of a multi-core processor, freeing the remaining cores to execute non-communications-related tasks. Shared-memory multi-processor systems, whether or not multi-core, also provide for increased instruction-execution throughput when computational problems can be decomposed to execute on multiple processors in ways that maintain reasonable Although multi-core microprocessors provide great promise for increasing instruction-execution throughput by simultaneous processing of multiple instruction streams associated with multiple threads or processes, development of operating systems, hypervisors, virtual-machine monitors, control programs, and application programs to take advantage of the capabilities of multi-core processors is often frustrated by various complexities, including proper decomposition of computational tasks and efficient communications between threads and/or processes simultaneously running on multiple cores. These problems are not unrelated to the already-encountered and reasonably well-understood problems associated with parallel-processor computers and distributed computing systems. Designers, manufacturers, vendors, and users of multi-core processors and certain shared-memory multi-processor systems continue to recognize the need for development of more efficient and easily-applied inter-core-communication and inter-processor-communications methods and supporting hardware mechanisms in order to facilitate higher overall instruction-execution throughput of computers and computer systems employing multi-core microprocessors and shared memory.

SUMMARY OF THE INVENTION

Certain embodiments of the present invention are directed to providing efficient and easily-applied mechanisms for inter-core and inter-processor communications and inter-core and inter-processor signaling within multi-core microprocessors and certain multi-processor systems. In one embodiment of the present invention, local advanced programmable interrupt controllers within, or associated with, cores of a multi-core microprocessor and/or processors of a multi-processor system are enhanced so that the local advanced programmable interrupt controllers can be configured to automatically generate inter-core and inter-processor interrupts when WRITE operations are directed to particular regions of shared memory. These shared-memory-WRITE-induced inter-core and inter-processor interrupts can be used to facilitate shared-memory-based communication between routines and programs executing on different cores within a multi-core microprocessor and different processors of certain types of multi-processor systems. Additional embodiments of the present invention may be directed to additional types of multi-core and multi-processor architectures.

BRIEF DESCRIPTION OF THE DRAWINGS

FIG. 6 illustrates the mapping of LAPIC registers to core memory-address space, for one type of LAPIC according to one family of processor architectures.

FIG. 13 provides a description of each of the fields of the new IMR register included in an enhanced LAPIC according to one embodiment of the present invention.

DETAILED DESCRIPTION OF THE INVENTION

Embodiments of the present invention are directed to efficient and easily-applied methods and mechanisms for generation and delivery of inter-core and multi-processor interrupts ("IPIs") within a multi-core processor and/or certain types of shared-memory multi-processor systems to facilitate inter-core and/or inter-processor communications. In one embodiment, described below, the local advanced programmable interrupt controllers ("LAPICs") within cores of a multi-core processor are enhanced to allow the LAPICs to be configured to detect WRITE operations directed by the cores to particular regions of shared memory, and, when such WRITE operations are detected, to generate and issue one or more IPIs to one or more target cores within the multi-core processor. Prior to discussing particular embodiments of the present invention, overviews of computer systems, event-recognition techniques, processor architectures, and advanced programmable interrupt controllers ("APICs") are first provided. It should be noted, at the onset, that, although the described embodiment is presented in the context of one type of multi-core processor, the present invention can be applied to other types of multi-core processors, and may, as well, be applied to various types of shared-memory multi-processor systems and architectures. Thus, in the following discussion, when implementation details related to a multi-core processor are described, similar implementation methods can also be applied to certain types of shared-memory multi-processor systems.

Figure 1:
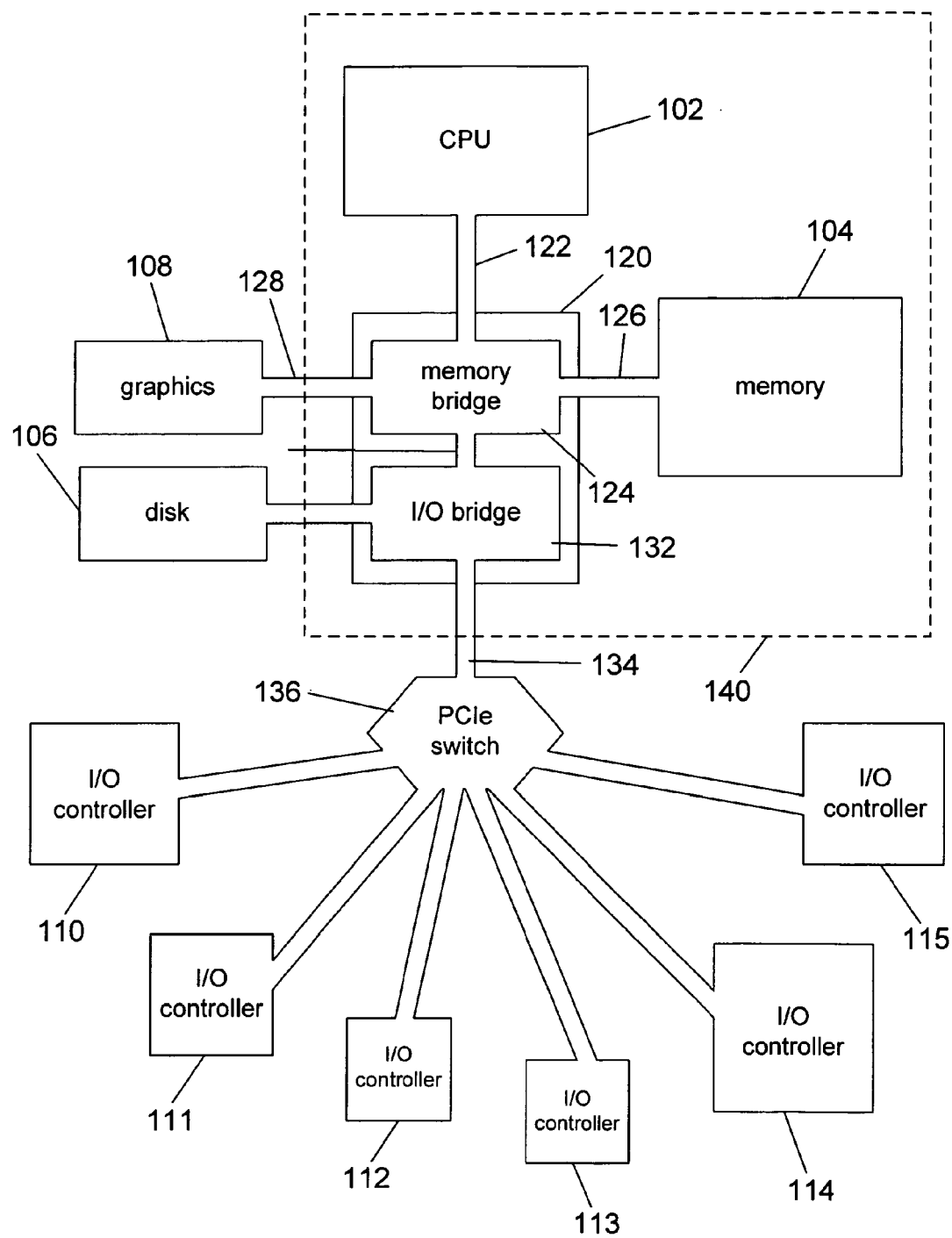
FIG. 1 provides a high-level description of a typical computer system in which embodiments of the present invention may be implemented.

FIG. 1 provides a high-level description of a typical computer system in which embodiments of the present invention may be implemented. A central processing unit ("CPU") 102, typically a microprocessor or multi-core microprocessor, executes computer programs loaded into memory 104 from a mass-storage device 106. The computer system typically displays output and other information on a graphics display monitor 108 and may also output data to the mass-storage device 106. The computer system typically receives input data from, and may output data and control signals to, a variety of input/output ("I/O") controllers 110-115 that control operation of various peripheral devices, including communications ports, and other such devices. The CPU is connected to a host bridge 120 by a system bus 122, and a memory bridge 124 within the host bridge 120 interconnects the system bus with a memory bus 126, an Accelerated Graphics Port channel 128, and an internal host-bridge bus 130 that interconnects the memory bridge with an I/O bridge 132. The I/O bridge 132 may be interconnected by a peripheral-connection communications medium, such as a PCIe communications medium 134, to various peripheral devices. In FIG. 1, the I/O bridge is interconnected with a PCIe switch 136, the PCIe switch interconnecting various I/O controllers 110-115 with one another and with the I/O bridge 132. Although not shown in FIG. 1, many slower peripheral devices, including keyboards and other user-input devices, may be interconnected to the I/O bridge by serial links and other, slower communications media. FIG. 1 describes the overall architecture of many personal computers, work stations, and servers.

Figure 2:
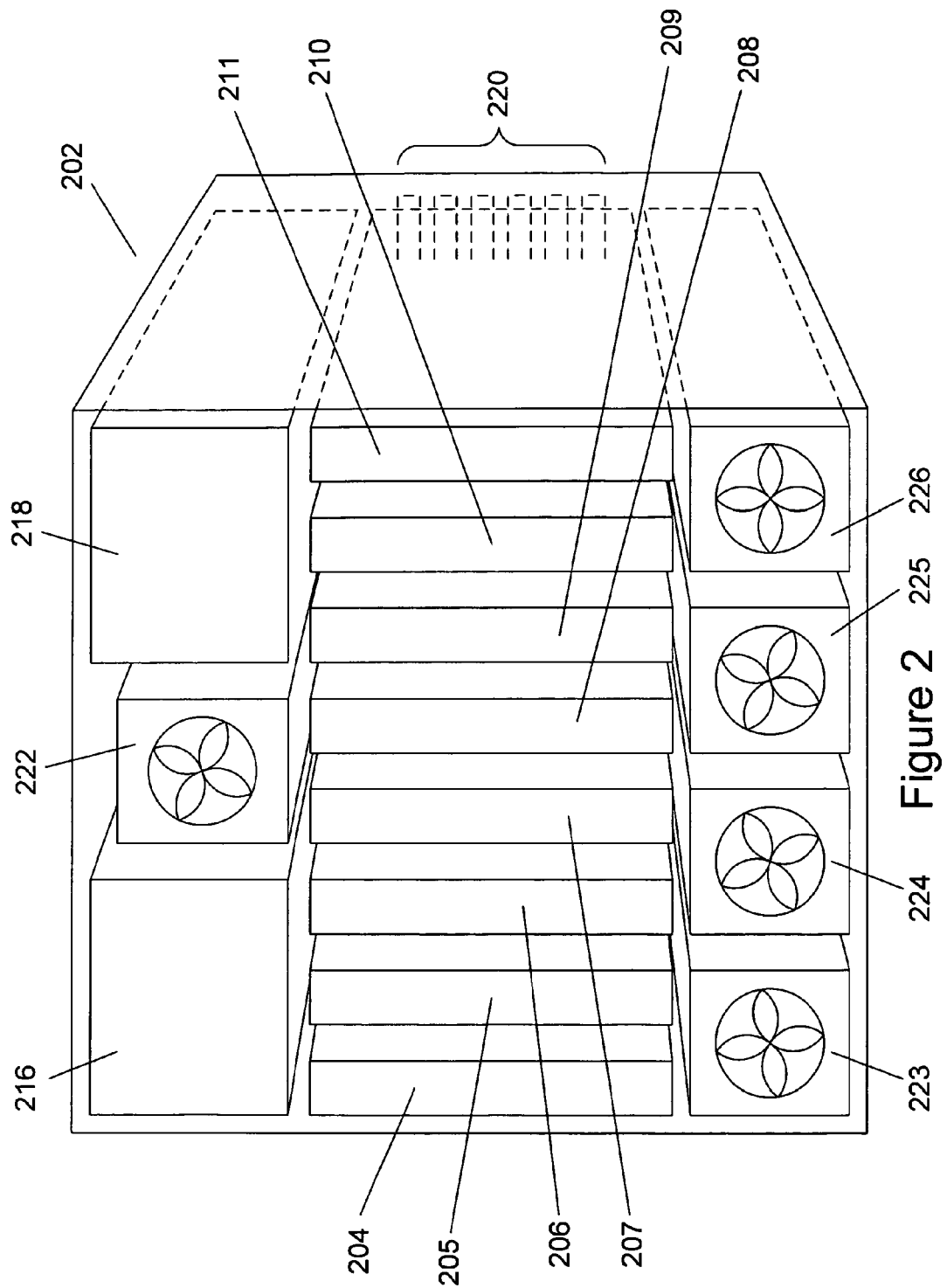
FIG. 2 illustrates a different type of computer system from that shown in FIG. 1 in which embodiments of the present invention may be implemented.

FIG. 2 illustrates a different type of computer system from that shown in FIG. 1 in which embodiments of the present invention may be implemented. FIG. 2 illustrates a multi-server enclosure, such as a blade system 202, that includes a number of server modules 204-211 interconnected with one another, with external communications media, and with additional multi-server-enclosure components, including redundant power supplies 216 and 218, via a back plane 220 into which the server modules plug through back plane connectors. The multi-server enclosure includes a number of redundant temperature-control components 222-226 and a variety of additional components and modules to facilitate interconnection of the multi-server enclosure with external communications media, to provide an administrator interface, and to monitor and control operation of the various components within the multi-server enclosure. The portion of the computer system within the dashed rectangle 140 in FIG. 1 is commonly included in the server modules 204-211 within the multi-server enclosure.

As discussed in the above brief overview of various computer-system architectures with reference to FIGS. 1 and 2, computer systems include many different types of internal communications media and ports to external communications media, and many different devices that bridge and control the various types of communications media. In most cases, communications through these various types of communications media, and the various devices that control communications, are ultimately controlled by a basic input/output system ("BIOS"), operating system ("OS"), or other control program executing on the CPU (102 in FIG. 1). The various communications devices, communications ports, and I/O controllers generate asynchronous events in response to signals received through the communications media and from devices controlled by the I/O controllers. In many cases, the CPU needs to be notified, in a timely fashion, when these events occur, so that appropriate operating-system routines, BIOS firmware routines, or other control-program routines can appropriately respond to the events. As one example, when an Ethernet controller receives data from an external Ethernet link and places the received data in memory (104 in FIG. 1), the Ethernet controller needs to notify the operating system that newly arrived data is available for processing. The operating system may, for example, transfer the data to application-program buffers for subsequent processing by an application program or may itself process the received data. Just as I/O controllers and other components of a computer system need to notify the CPU of various events, the CPU may need to notify I/O controllers and other components of CPU-generated or CPU-detected events.

Figure 3:
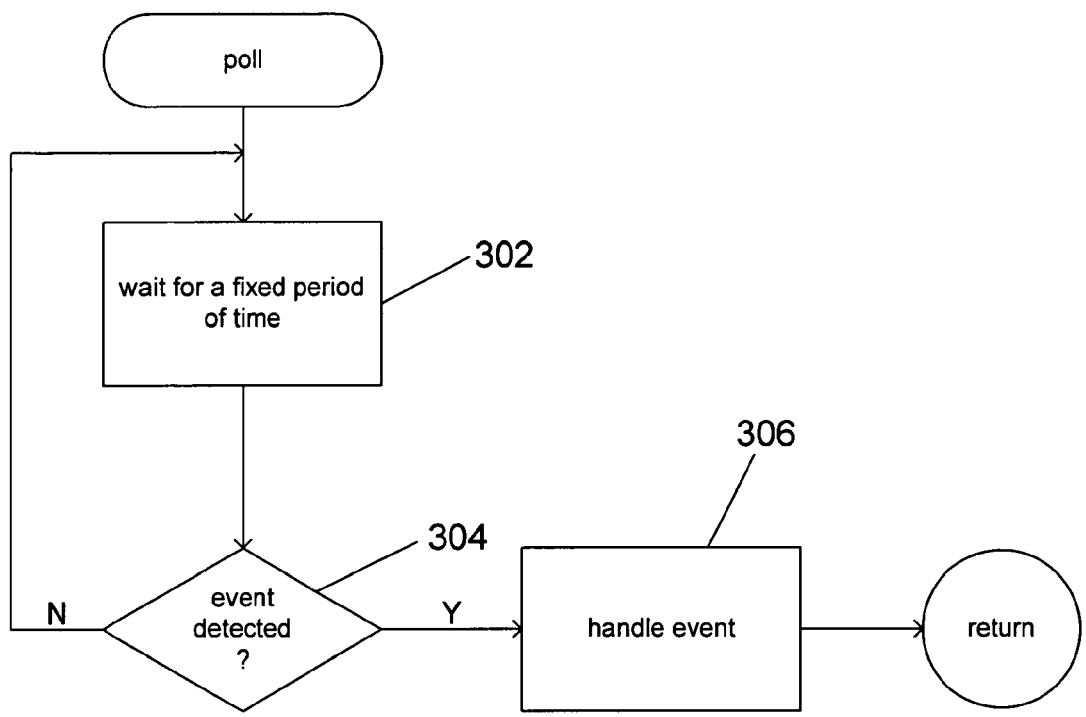
FIG. 3 illustrates the polling method for event detection.

There are two different techniques commonly employed by software routines, firmware routines, and logic circuits to detect various types of events that occur in the computer system. FIG. 3 illustrates the polling method for event detection. When a CPU polls a register or other information-containing or information-receiving component to detect a change of state of the register or component corresponding to an event, the CPU enters a loop, shown in FIG. 3 as steps 302 and 304, to periodically access the register or other information-containing or information-receiving component to check whether the state of the memory register or component has changed as a result of an occurrence of an event. Once occurrence of an event is detected, in step 304, then a routine is called to handle the event, in step 306. Waiting for a fixed period before checking the state of the memory register or other component, in step 302, can be implemented in various different ways. In many cases, the checking operation is incorporated into a larger event loop, in which the occurrences of various different types of events is repeatedly monitored by an operating system or other control program. Alternatively, an operating system or other control program can set a timer to expire after a fixed period of time. Upon expiration, the timer generates an interrupt to notify the operating system of the occurrence of the event or may directly invoke a monitoring routine.

Although it is often stated that polling is inefficient, there are cases, for which polling is not an inefficient method for event detection, particularly when events occur at regularly varying intervals or in predictable patterns. As another example, when a producer of events and/or data and a consumer of the events and/or data both access a shared, cacheable memory, polling of a location in a shared, cacheable memory by the consumer may be quite efficient, in terms of memory-bus cycles, since memory-bus operations related to the location are not generated until the producer writes to the location. However, for asynchronous communications with unpredictable times and patterns of event occurrences, polling can be quite inefficient. Each time a processor or core checks the status of a memory register or other component for a change of state that represents the occurrence of an event, instructions are executed and processor cycles are expended. When only a small number of such checks result in event detection, the expended processor cycles are essentially wasted.

Figure 4:
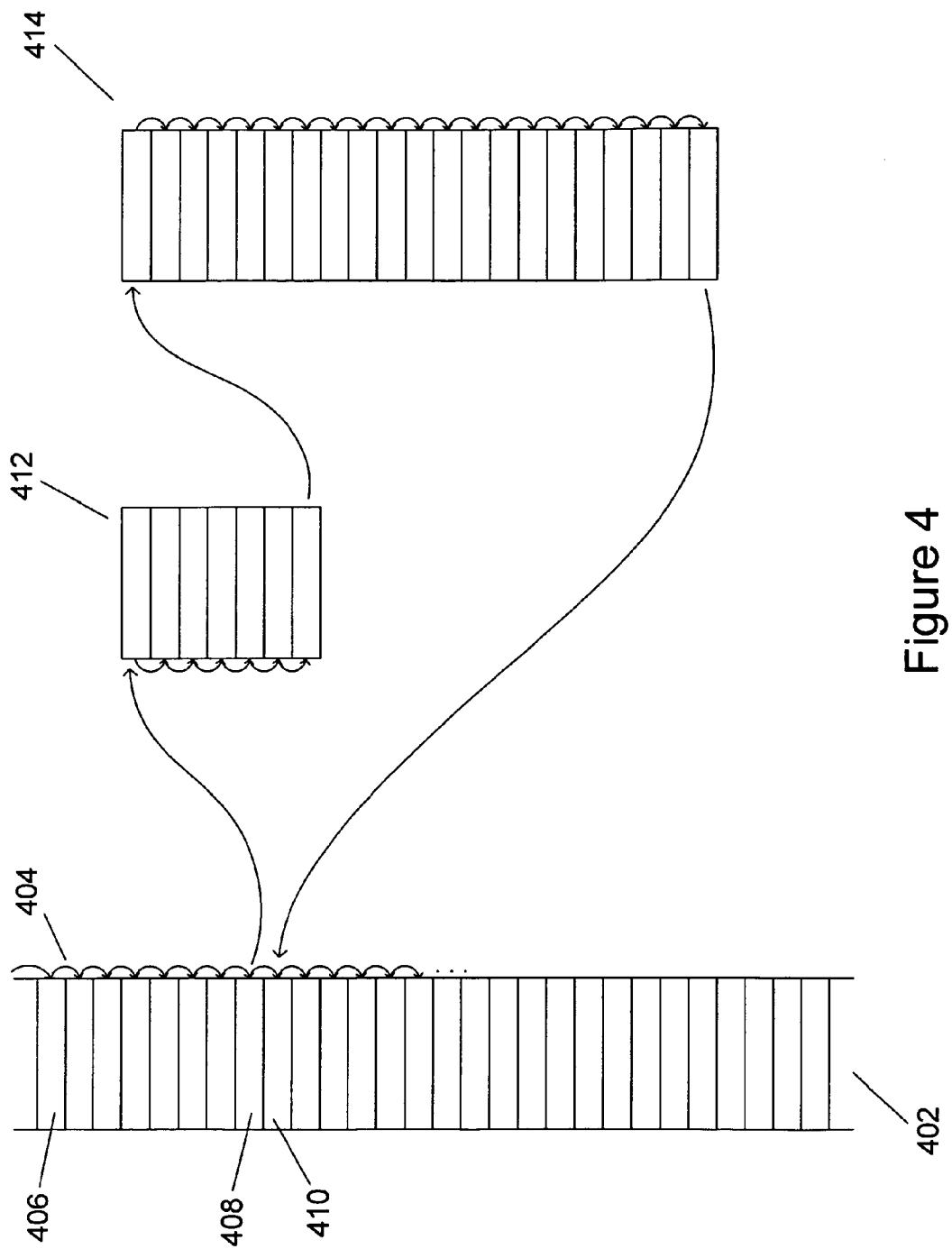
FIG. 4 illustrates the interrupt method for event detection.

FIG. 4 illustrates the interrupt method for event detection. In FIG. 4, a first column of instructions 402 corresponds to a sequence of instructions within a currently executing operating-system routine. The sequential execution is indicated by curved arrows, such as arrow 404, indicating that, after execution of each instruction, control flows to the following instruction, which is then executed. In FIG. 4, each instruction is represented by a rectangular cell within the column, such as instruction 406. Interrupts are generated by a hardware mechanism that allows the sequential execution of an operating-system routine, or other routine, to be interrupted and execution transferred to another routine designed to handle an event occurrence. In FIG. 4, during execution of instruction 408, an interrupt signal is received by the CPU. When execution of instruction 408 completes, rather than continuing on to execute instruction 410, the CPU instead transfers control to an interrupt service routine 412 that saves the current context of the previously executing operating-system routine 402 and carries out other brief tasks prior to calling an interrupt handling routine 414 that processes the received interrupt in order to respond to the occurrence of the event that elicited generation of the interrupt. Following completion of the interrupt-handling routine 414, the context of the originally executing operating-system routine 402 is restored and control flows back to instruction 410 of the originally executing operating-system routine 402 for subsequent execution.

FIG. 4 illustrates a very simple case. In general, interrupt processing is complicated by the fact that many different types of interrupts may be received by a CPU, and interrupts may be received close together in time, or even simultaneously. Interrupts are generally prioritized, and may be stacked within the hardware so that interrupts can be handled, in turn, in decreasing order of priority. The type of interrupt is often encoded in a small data unit, such as a byte, referred to as an "interrupt vector," which can be used by the interrupt service routine (412 in FIG. 4) to index a jump table or dispatch table containing addresses of various interrupt-handling routines, so that an appropriate interrupt-handling routine is called to handle each different type of interrupt.

Interrupt-based event detection can be far more efficient than polling, particularly when the events to be detected occur asynchronously and do not occur at predictable times or in regular patterns. In addition, because of the relatively flexible and complex functionality incorporated into hardware interrupt mechanisms, use of interrupts for event detection may avoid needless redundant effort to implement polling-based methods of similar functionality in operating-system routines or other software programs.

Figure 5:
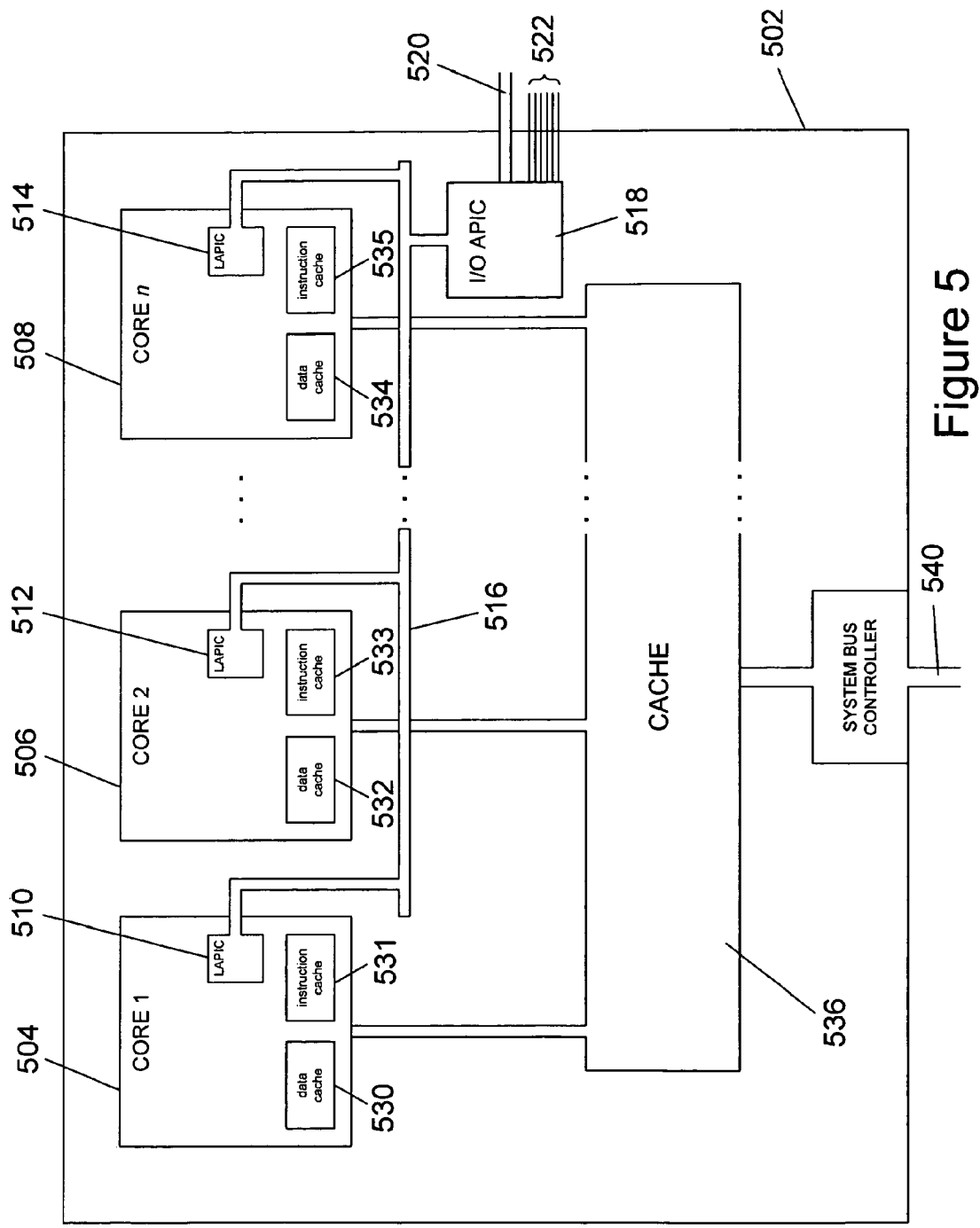
FIG. 5 provides a description of certain salient features of a multi-core processor.

FIG. 5 provides a description of certain salient features of a multi-core processor. FIG. 5 is not intended to provide a detailed description of the hardware circuitry within a microprocessor, but simply to illustrate components, and interconnections between components, related to embodiments of the present invention. Furthermore, different multi-core microprocessor architectures may use different components and interconnections between components to achieve the functionality provided by the components and interconnections shown in the example of FIG. 5. Embodiments of the present invention are generally applicable, and not restricted in application to the types of multi-core processors illustrated in FIG. 5. Moreover, as discussed above, embodiments of the present invention are generally applicable to certain types of shared-memory multi-processor systems, regardless of whether or not the processors are multi-core processors or single-core processors. However, a multi-core processor provides a reasonable system for illustrating embodiments of the present invention.

A multi-core processor 502 is generally implemented on a single die, or chip. The multi-core processor includes a number n of cores 504, 506, . . . , 508 where n is generally 2, 4, 8, or some other, larger power of 2. Currently, for personal computer systems and work stations, two-core and four-core microprocessors are commonly encountered. Each core is an independent instruction-execution engine, with all of the well-known processing components of a single-core processor, including instruction fetch, arithmetic logic unit, general-purpose and specialized registers, including an instruction-pointer register, and other such components. Each core can independently execute a stream of instructions at any instant in time, and, when hyperthreaded, can concurrently execute two or more streams of instructions at any instant in time. As shown in FIG. 5, each core contains a LAPIC 510, 512, 514. The LAPICs may be interconnected by a bus 516 and additionally connected by the bus to an I/O APIC 518. The I/O AMC may be additionally interconnected, by the same or a different bus 520, to other I/O APICs and LAPICs in external microprocessors. Although the I/O APIC is shown, in FIG. 5, as a component of a multi-core processor, the I/O APIC may also be a separate, discrete component of a computer system. Interrupt signal lines from I/O devices and other interrupt-generating components 522 connect to pins on the I/O APIC. When an interrupt signal is received by the I/O APIC from an interrupt-generating device, the I/O APIC translates the interrupt into a numeric value indicating the type of interrupt that has been received and transmits the interrupt through the bus 516, in an interrupt message, to one of the LAPICs 510, 512, 514. A LAPIC that receives the interrupt message then translates the interrupt message into an interrupt vector that is displayed in a register accessible by the core and additionally signals the core, through one or a few internal signal lines, that an interrupt has occurred. Once signaled, execution of the current program by the core is interrupted, when the priority of the interrupt is greater than the priority of the currently executing routine, to invoke an interrupt handler, as discussed above with reference to FIG. 4.

Each core additionally contains data and instruction caches 530-535, collectively referred to as the "L1 cache." All of the cores share a larger L2 cache 536. As discussed above, the processor is connected by a system bus 540 to a memory-bridge component, in turn connected to memory through a memory bus. Data and instructions are fetched from memory into the L2 cache and the L1 caches. When a processor attempts to fetch a next instruction or load a next data value into an internal register, the core seeks the instruction or data value in the L1 cache (530 and 531 for core 504, for example). When the data or instruction cannot be found in the L1 cache, then the core looks instead to the L2 cache. If the instruction or data is found in the L2 cache, then the instruction or data is moved to the L1 cache and processing continues. On the other hand, if the instruction or data cannot be found in the L2 cache, then the processor fetches the instruction or data from memory. A memory fetch may involve an additional fetch of instructions or data from a mass-storage device by a virtual-memory paging mechanism. When a data value or instruction is fetched from memory into L2 cache, the data or instruction is then copied into L1 cache to allow the core to continue execution. When a processor writes data to memory, the data is written to the L1 cache, and migrates back to the L2 cache and to memory only on an as-needed basis. Complicated mechanisms are employed to ensure that memory READ and WRITE operations by all of the cores within the multi-core processor are properly serialized. Thus, if core 506 attempts to read a data value from a memory location that has been recently written by core 504, then the contents of the memory location are flushed from the L1 cache of core 504 to the L2 cache, and potentially to memory, before core 2 can read the memory location. A variety of mechanisms are employed, including cache snooping mechanisms, to properly serialize accesses to memory through the caching system so that stale data in memory is not returned to an accessing core when a more current value resides in the L1 cache of another processor. Other types of memory-access serialization are also carried out. As part of this process, cache-invalidation and write-back operations are carried out, as needed, to ensure that all cores receive a consistent view of memory.

The LAPICs (510, 512, and 514 in FIG. 5) provide a register-based interface to the cores that include them. The LAPIC registers are mapped to the core's memory-address space, so that a core can access LAPIC registers through READ and WRITE operations. FIG. 6 illustrates the mapping of LAPIC registers to core memory-address space, for one type of LAPIC according to one family of processor architectures. The LAPIC registers are mapped to 16-byte-aligned memory addresses. LAPIC-register address space begins with the hexadecimal address "FEE0_0000." The first two 16-byte-aligned memory regions are reserved, so the first LAPIC register 602 is mapped to the hexadecimal address "FEE0_0020." The final LAPIC register 604 is mapped to the hexadecimal address "FEE0_03E0." In FIG. 6, additional 16-byte-aligned regions, beginning with hexadecimal address "FEE0_0400," are shown as dashed lines to indicate that additional memory regions following the APIC register mappings are available. Certain embodiments of the present invention employ additional LAPIC registers and LAPIC-register mappings to core memory-address space, beginning at hexadecimal address "FEE0_0400" 606, as discussed below.

Figure 7:
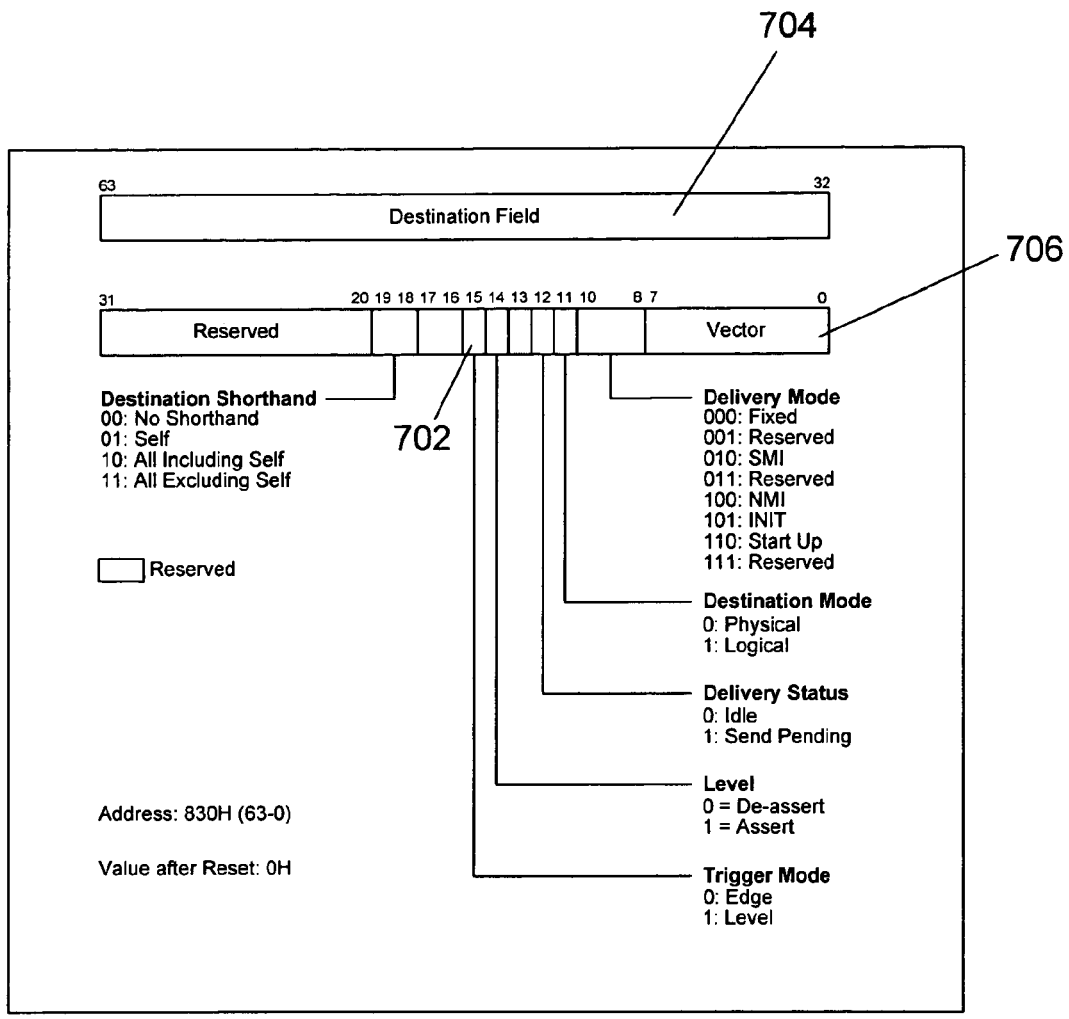
FIG. 7 illustrates the interrupt command register mapped to two, contiguous 16-byte-aligned memory regions with addresses "FEE0_0300" and "FEE0_0310."

Each of the various LAPIC registers is defined to contain different types of information, often in bit fields or byte fields of varying lengths. FIG. 7 illustrates the interrupt command register ("ICR") mapped to two, contiguous 16-byte-aligned memory regions with addresses "FEE0_0300" and "FEE0_0310." Certain of the fields, such as the trigger-mode bit field 702, describe characteristics of an interrupt to be generated by the LAPIC. The ICR is used by a core to generate an IPI for delivery to one or more external cores. In order to generate an IPI, the core writes a value into the destination field 704 to indicate to which external core or cores the IPI should be delivered, and then writes an interrupt vector into the vector field 706, and optionally sets other bits in the lower 32-bit portion of the ICR, causing the LAPIC to issue an IPI identified by the interrupt vector to the one or more cores identified by the value placed in the destination field 704 via the I/O APIC. This operation involves two WRITE operations, one directed to the upper 32-bit portion of the ICR and one to the lower 32-bit portion of the ICR, because these two portions of the ICR are generally not contiguous. The fact that two WRITE operations are needed to generate an IPI entails certain consequences, discussed below, that lead to problems for inter-core communications. When a LAPIC receives an interrupt from the I/O APIC, the interrupt vector corresponding to the interrupt is placed in the in-service register ("ISR") (610 in FIG. 6) and a signal is generated to the core so that the core can then retrieve the interrupt vector, and other information related to the interrupt, from the ISR in order to handle the interrupt.

Figure 8:
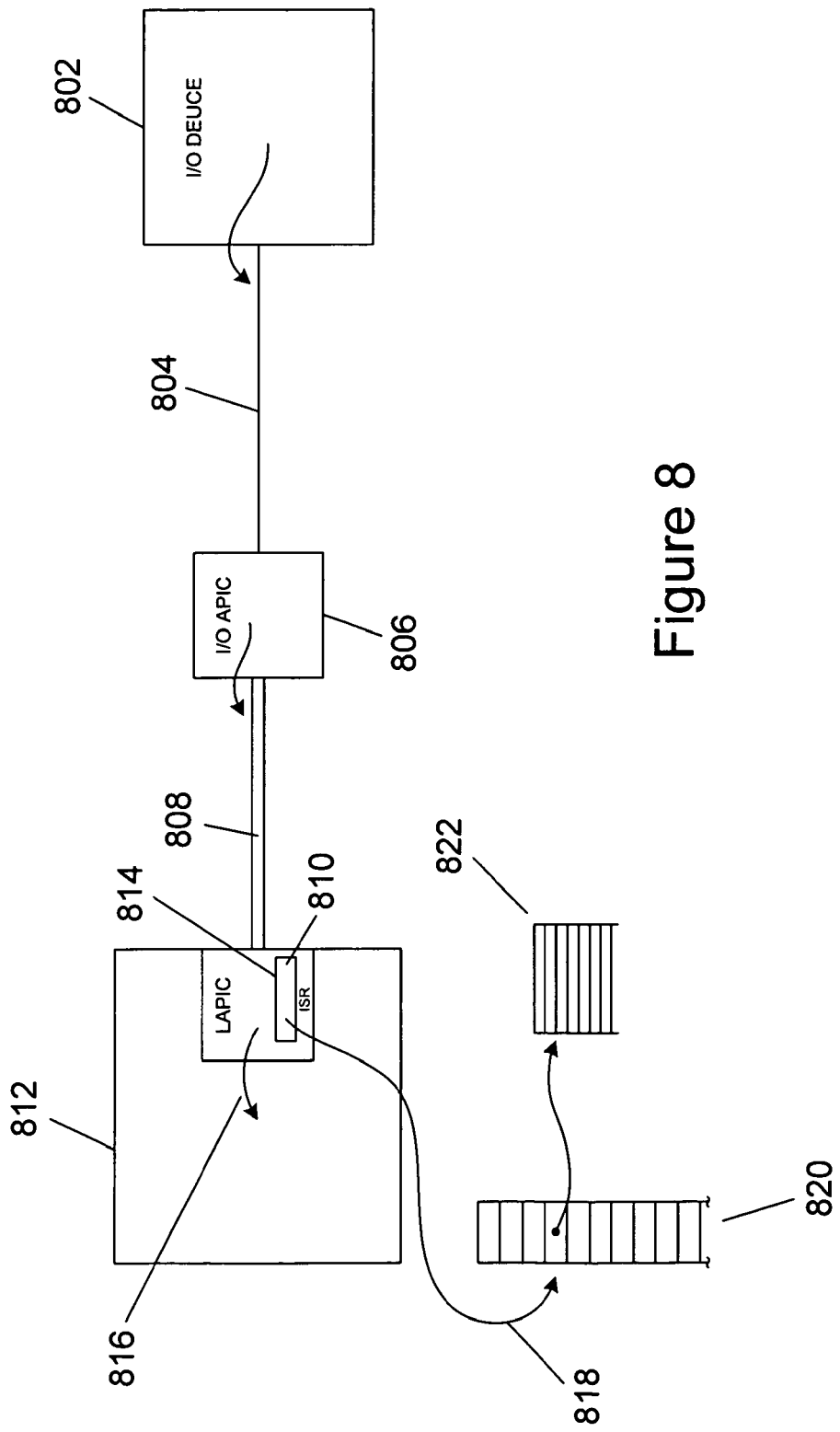
FIG. 8 illustrates one type of interrupt-generation and interrupt-delivery mechanism in the multi-core processor illustrated in FIG. 5.

FIG. 8 illustrates one type of interrupt-generation and interrupt-delivery mechanism in the multi-core processor illustrated in FIG. 5. As shown in FIG. 8, an I/O-device controller 802 may generate an electrical interrupt signal on an interrupt-signal line 804 that is received by the I/O APIC 806. In response to sensing the electrical interrupt signal, the I/O AMC translates the received electrical signal into an interrupt message, including a numeric identifier of the received interrupt, on a bus 808 to the LAPIC within a core of the multi-core processor 810 and 812. The LAPIC uses the numeric value for the interrupt and additional information to generate and place an interrupt vector corresponding to the interrupt into the ISR 814, and additionally generates an electronic signal 816 to inform the core 812 that an interrupt has been delivered. The operating system executing on the core then reads the contents of the ISR register 810, extracts the interrupt vector, and uses the interrupt vector 818 as an index into a jump table 820 to invoke the appropriate interrupt-handler routine 822, as discussed above, in greater detail, with reference to FIG. 4.

Figure 9:
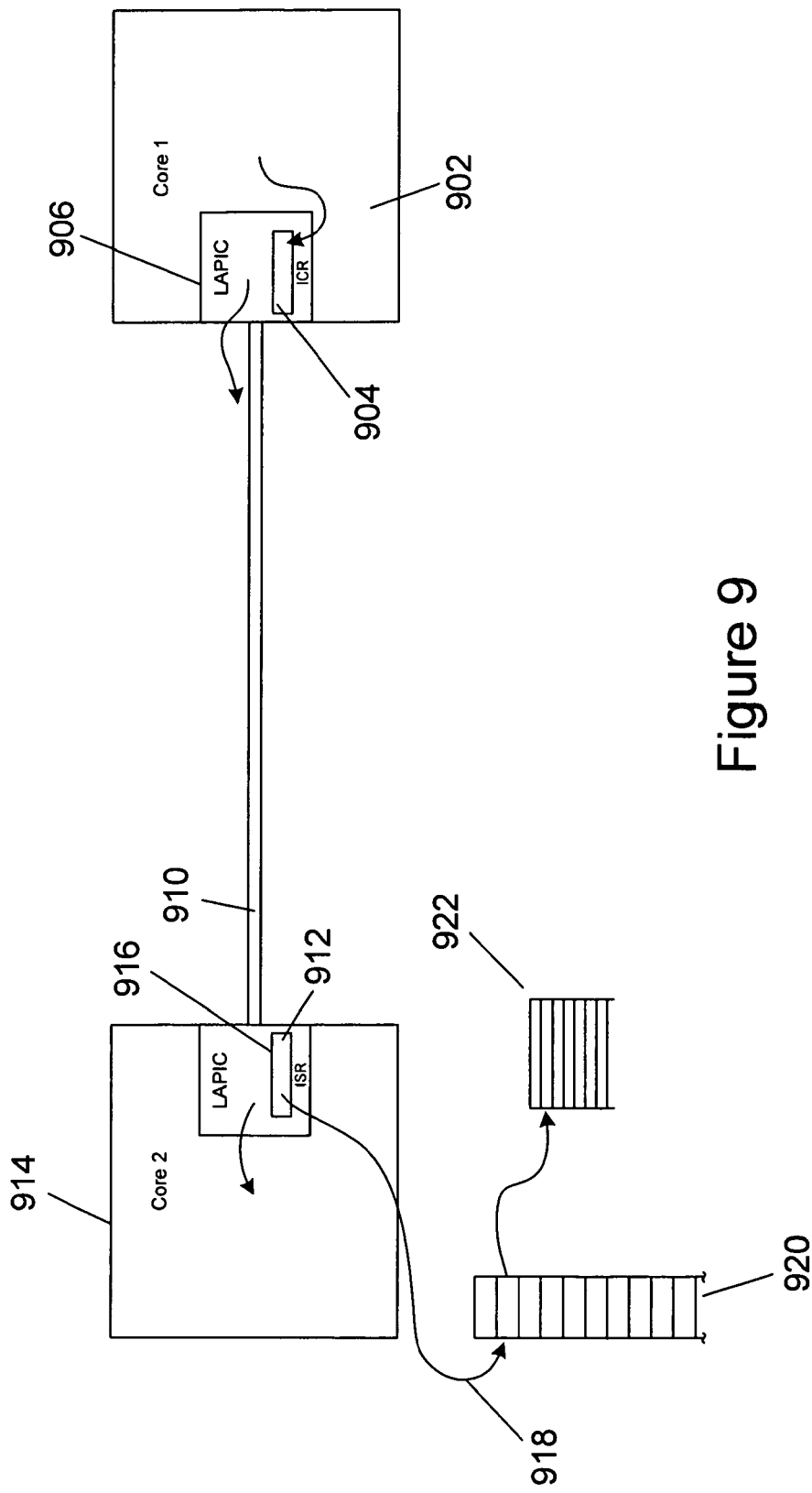
FIG. 9 illustrates another type of interrupt-generation and interrupt-delivery mechanism within a multi-core processor, such as the multi-core processor shown in FIG. 5.

FIG. 9 illustrates another type of interrupt-generation and interrupt-delivery mechanism within a multi-core processor, such as the multi-core processor shown in FIG. 5. In FIG. 9, a first core 902 writes a destination address and interrupt vector into the ICR register 904 of an internal LAPIC 906, causing the LAPIC to transmit an interrupt message one or more cores identified as targets for interrupt delivery by the first core. In FIG. 9, the interrupt message is transmitted on the bus 910 to the LAPIC 912 of a second core 914. The LAPIC of the second core generates an interrupt vector and places the interrupt vector, and other information related to the interrupt, in the ISR register 916, and additionally generates a signal to the second core 914 to inform the second core of the arrival of the interrupt. The operating system of the second core extracts needed information from the ISR, including the interrupt vector, and uses the interrupt vector 918 as an index into a jump table 920 in order to invoke the appropriate interrupt-handler routine 922.

Figure 10A:
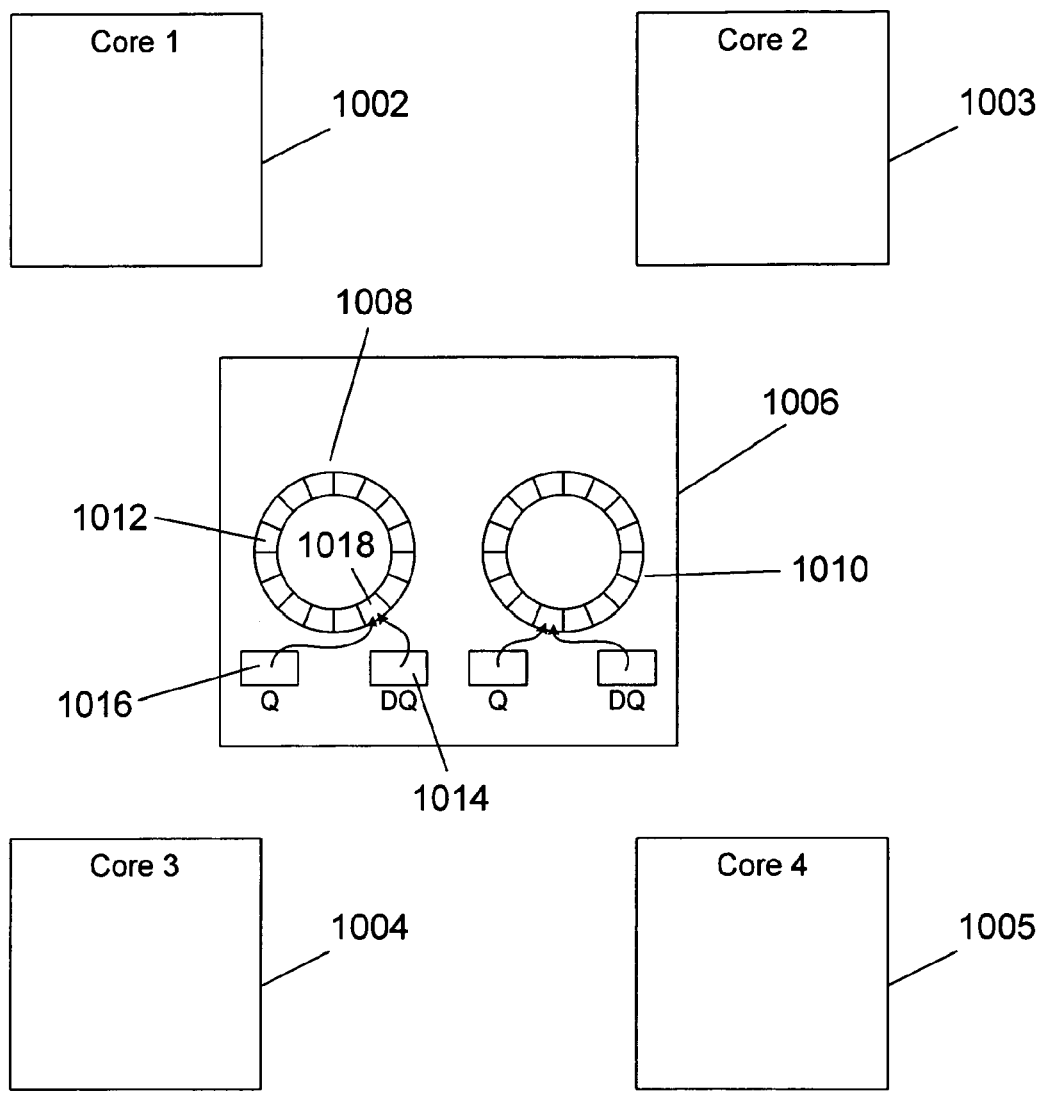
FIGS. 10A-D illustrate one approach to inter-core communications within a multi-core processor, such as the multi-core processor illustrated in FIG. 5.

FIGS. 10A-D illustrate one approach to inter-core communications within a multi-core processor, such as the multi-core processor illustrated in FIG. 5. When computational problems are decomposed, with different portions of the problem handled by different routines or programs executing on two or more different cores, the two or more different routines or programs often need to communicate results back and forth between one another, and may additionally need to request information from one another. One well-established method for doing so is to employ first-in-first-out ("FIFO") queues in shared memory, one FIFO queue for each direction of information transmission. For example, FIG. 10A shows four cores 1002-1005 within a multi-core processor, as well as a region of shared memory 1006 in which two FIFO queues 1008 and 1010 have been allocated and initialized. In this example, a first core 1002 needs to communicate with a second core 1005, with bi-directional communications occurring both from the first core to the second core and from the second core to the first core. Again, as discussed above, FIFO queues are simply one example of a method for inter-core or inter-processor communications based on exchanging information through a shared-memory. Many other methods, involving an enormous variety of different types of information encodings and data structures, are possible, and all such methods can benefit from embodiments of the present invention that facilitate inter-core and inter-0processor communications.

The FIFO queues are represented, in FIG. 10A and in subsequent figures, as circular queues. For example, FIFO queue 1008 includes a circular queue-entry-containing region 1012 and two pointers: (1) a DQ pointer 1014, or reference, that points to a first entry to be removed from the FIFO queue in a dequeue operation; and (2) a Q pointer 1016 that indicates the first free, unoccupied entry, or free slot, in the FIFO queue to which a new entry can be queued in a enqueue operation. When both the DQ and Q pointers 1014 and 1016 point to the same queue entry (1018 in FIG. 10A), the queue is empty. In fact, a FIFO queue is generally implemented in a contiguous sequence of words or larger structures in memory, and is circularized by using modulo n arithmetic for incrementing the Q and DQ pointers, where n is the number of slots in the queue. In general, queue slots are small units of memory, such as one or a few 32-bit, 64-bit, or 128-bit words that include a memory reference to memory buffers into which larger amounts of information being transferred between cores is placed.

Figure 10B:
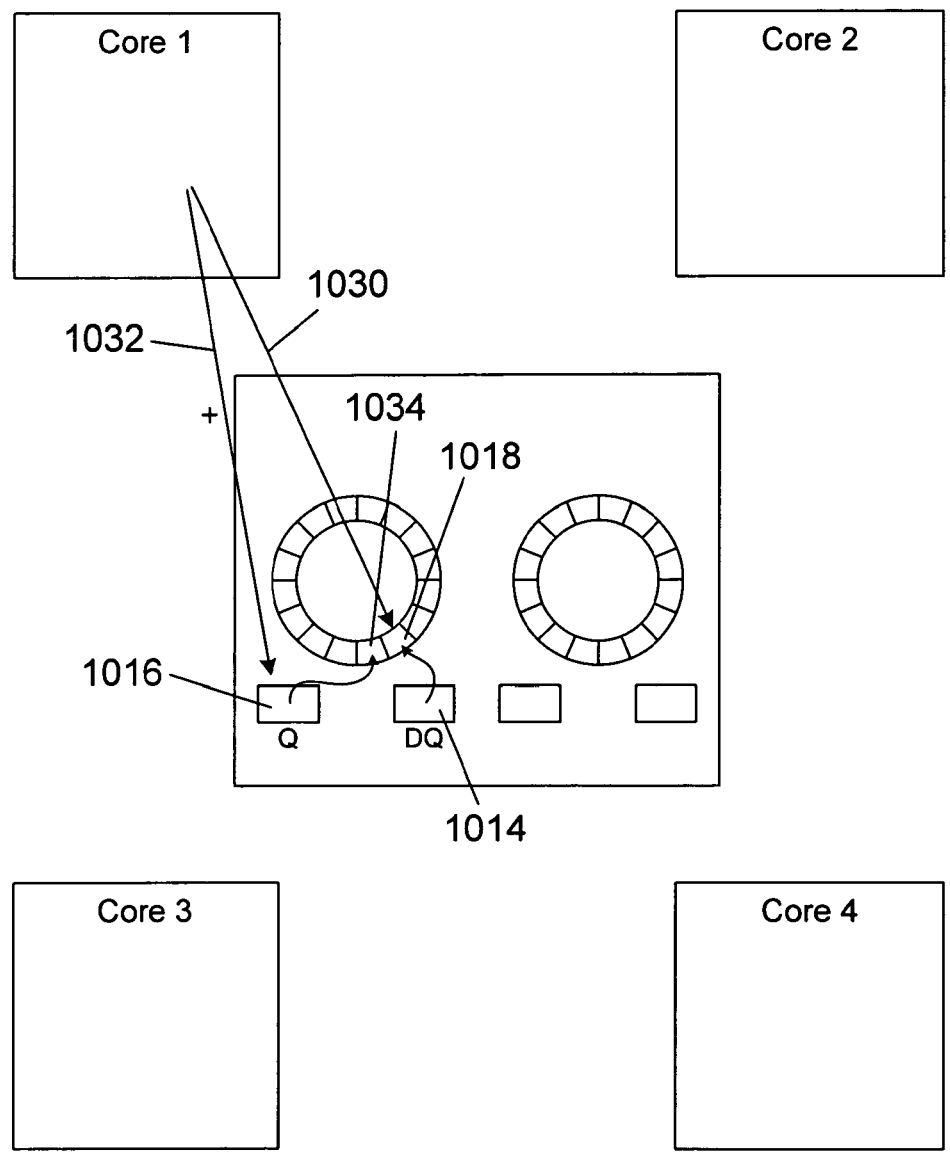
Figure 10C:
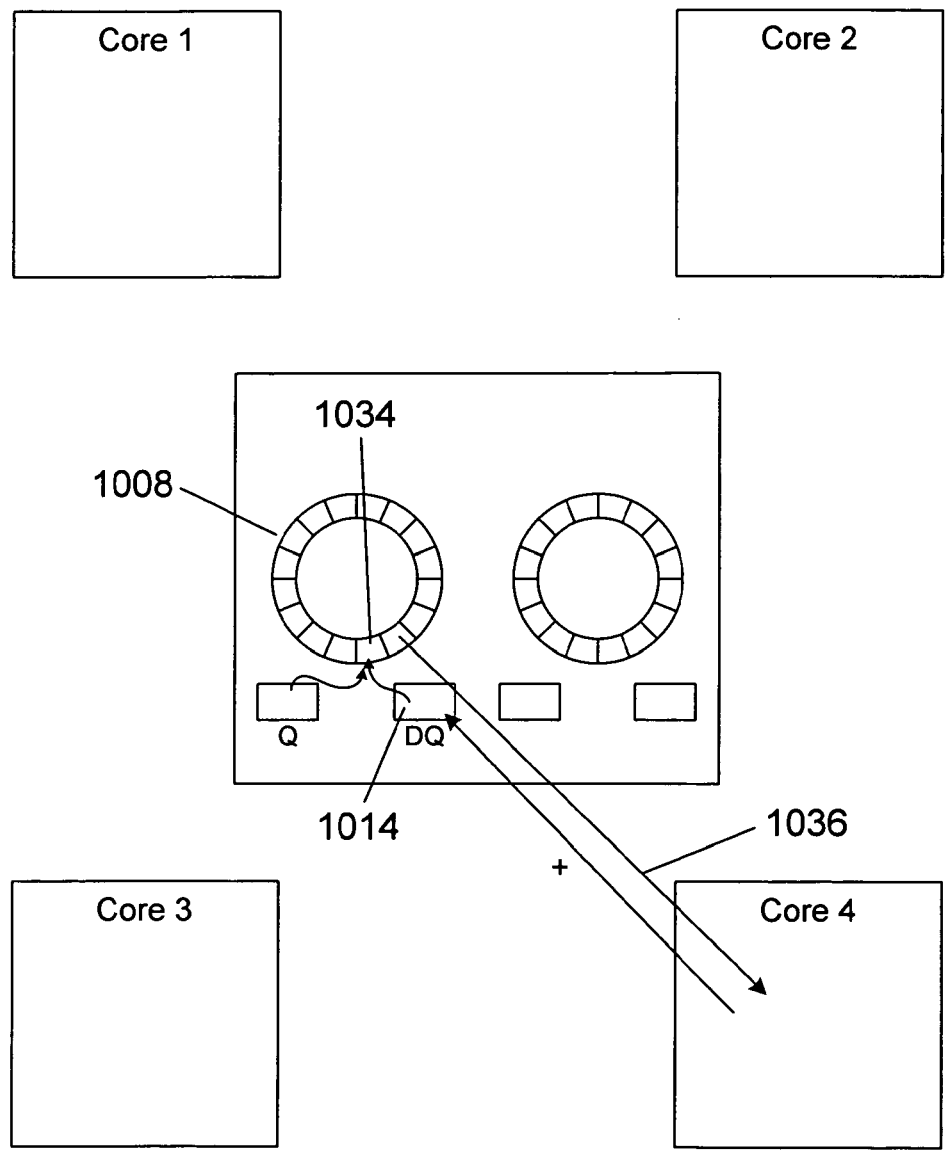

FIGS. 10B-C illustrate transfer of one data item from the first core to the second core discussed above with reference to FIG. 10A. In FIG. 10B, the first core uses the Q pointer (1016 in FIG. 10A) to locate the next free queue slot 1018 and, as indicated in FIG. 10B by arrow 1030, queues an entry into slot 1018. As indicated by arrow 1032, the first core then increments the Q pointer 1012 by modulo it arithmetic to point to the next queue entry 1034. As shown in FIG. 10C, once the second core 1005 becomes aware of a newly queued entry in the FIFO queue 1008, the second core uses the DQ pointer (1014, as shown in FIG. 10B) to locate the entry in the queue and retrieves the queue entry, as indicated by arrow 1036 in FIG. 10C. In addition, the second core increments the DQ pointer 1014, by modulo n arithmetic, in order to indicate that the next entry for removal is now the entry in slot 1034. Of course, since there was only one entry on the queue prior to the second core's dequeue operation, the DQ and Q pointers now point to the same slot 1034, indicating that the FIFO queue 1008 is empty.

Figure 10D:
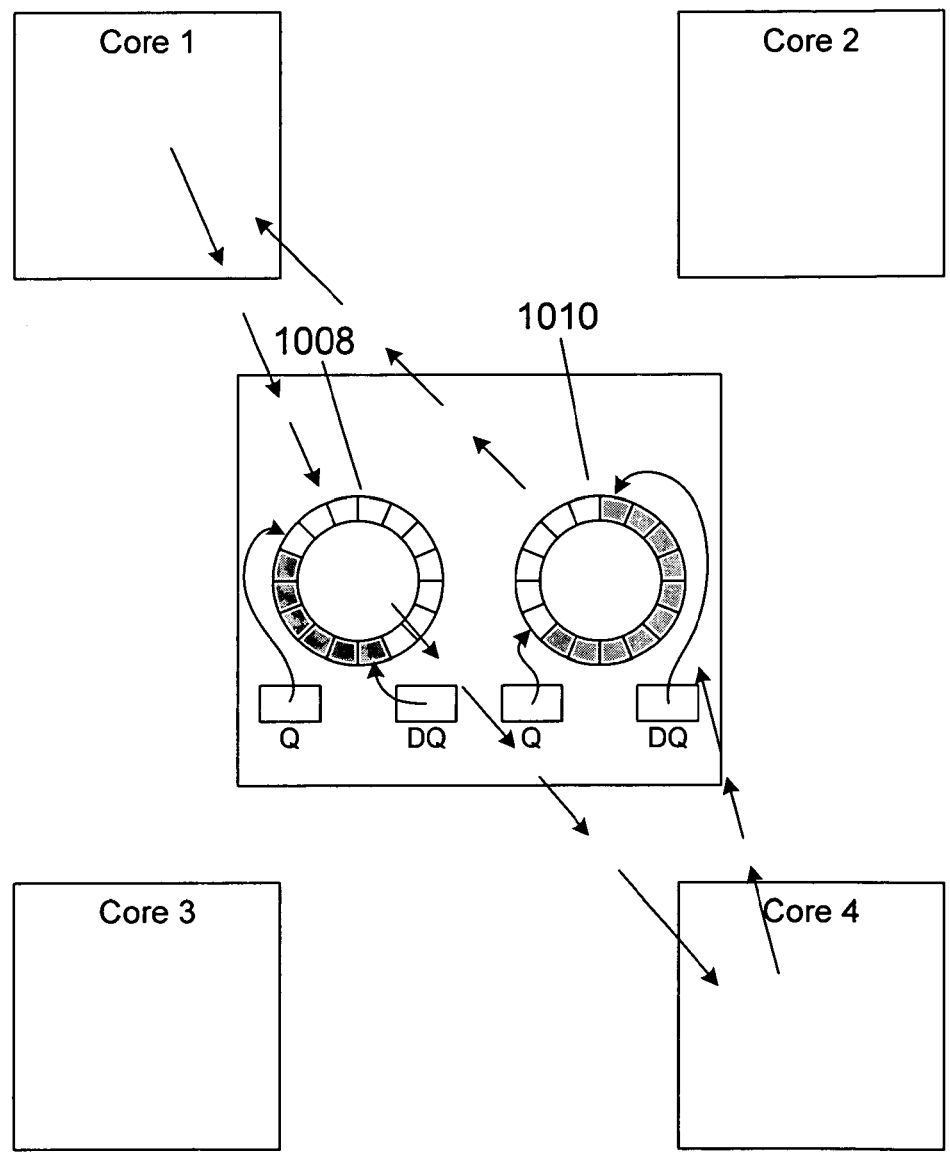

As shown in FIG. 10D, during bi-directional communications between the first and second cores, many different enqueue and dequeue operations may be performed during even very short intervals of time, and the number of entries queued on the FIFO queues 1008 and 1010 may, at any instant in time, represent a relatively large fraction of the total available queue entries within with the FIFO queues. Should either core not quickly detect the arrival of new queue entries for processing, the queues might easily become filled, resulting in interruption of one or more directions of the bi-directional communications. When communications are interrupted, programs and routines may stall, and instruction-execution throughput correspondingly decreases, in some cases below the instruction-execution throughput that would have been achieved in a single-core-processor implementation. Thus, timely detection of WRITE operations to FIFO queues in shared memory used for inter-core communication is crucial to facilitating efficient multi-core program execution.

In the example shared-memory-based communications system of FIGS. 10A-D, the first core 1002 is a producer, and the second core 1005 is a consumer, with respect to FIFO queue 1008. A producer places entries into a queue, and a consumer removes entries from a queue, in a bi-directional communications system in which FIFO queues are used for each direction of information transfer. Similarly, the second core 1005 is a producer, and the first core 1002 is a consumer, with respect to FIFO queue 1010. In this discussion, producers and consumers are associated with particular cores, with respect to a particular FIFO queue, although, in general, both producers and consumers are executable entities running at some execution level within the respective cores. One technique by which a producer can notify a consumer after placing one or more entries into a FIFO queue is to generate an IPI directed to the consumer. By this method, the producer can attempt to ensure that the consumer will be notified of the new entry or entries as quickly as the IPI can be generated and delivered to the consumer, by the IPI mechanism described above with reference to FIGS. 7 and 9.

However, there are a number of problems associated with the ICR-based IPI mechanism. First, as discussed above, generating an interrupt via the ICR-based IPI requires two WRITE operations to the ICR. There is a therefore synchronization problem, since the two WRITE operations are not, together, an atomic operation. Were, for example, a first process to execute a WRITE the destination field (704 in FIG. 7) to prepare to generate an IPI, and then be preempted by a second process that executes two WRITE operations to the ICR to generate a different IPI, the first process, upon resuming execution, might then issue a second WRITE operation to the lower 32-bit portion of the ICR, assuming that the destination written by the first process is still in the higher 32-bit portion of the ICR, and inadvertently generate a second IPI to destination to which the second process had just directed an IPI, rather than generating the IPI to the destination to which the first process intended the IPI to be sent. Therefore, in general, a synchronization method must be used to create an atomic operation from the two ICR-access operations needed to generate an IPI. Synchronization methods, such as spin locks and semaphores, introduce additional memory-access overheads to the IPI process. Even when the synchronization method is employed, the ICR-based mechanism may still be associated with problems. For example, in the above-discussed example, the first process may acquire a spin lock, or access to the ICR via a semaphore operation, and carry out the first WRITE operation to the ICR, but may then be preempted by a higher-priority operating system routine, which then executes for a period of time prior to relinquishing execution to higher-level processes. There may be a significant delay before the first process again resumes execution, and completes IPI generation. Because synchronization primitives have been employed, as long as the operating system acknowledges the synchronization protocol, there is no danger that the ICR will be partially or fully overwritten, as in the previous case discussed above. However, such delays, or latencies, can be sufficiently long to result in filled FIFO queues and concomitant communications interruptions. One possible solution is to embed IPI generation within critical sections—but this solution requires significant operating system support and potentially significant changes to the operating system. Even more problematic is that fact that many operating systems do not provide access to the ICR to higher-level threads and processes. In such cases, even were a specialized control program running on a sequestered core able to properly use the ICR-based IPI mechanism to notify consumers running above the operating system on cores running general-purpose operating systems, the consumers could not then, in the role of a producer, generate an IPI to alert a consumer on the sequestered core of newly queued information available for the consumer on the sequestered core. For these reasons, ICR-based IPI generation is not satisfactory for facilitating bi-directional, shared-memory-based communications between cores or processors.

Figure 11A:
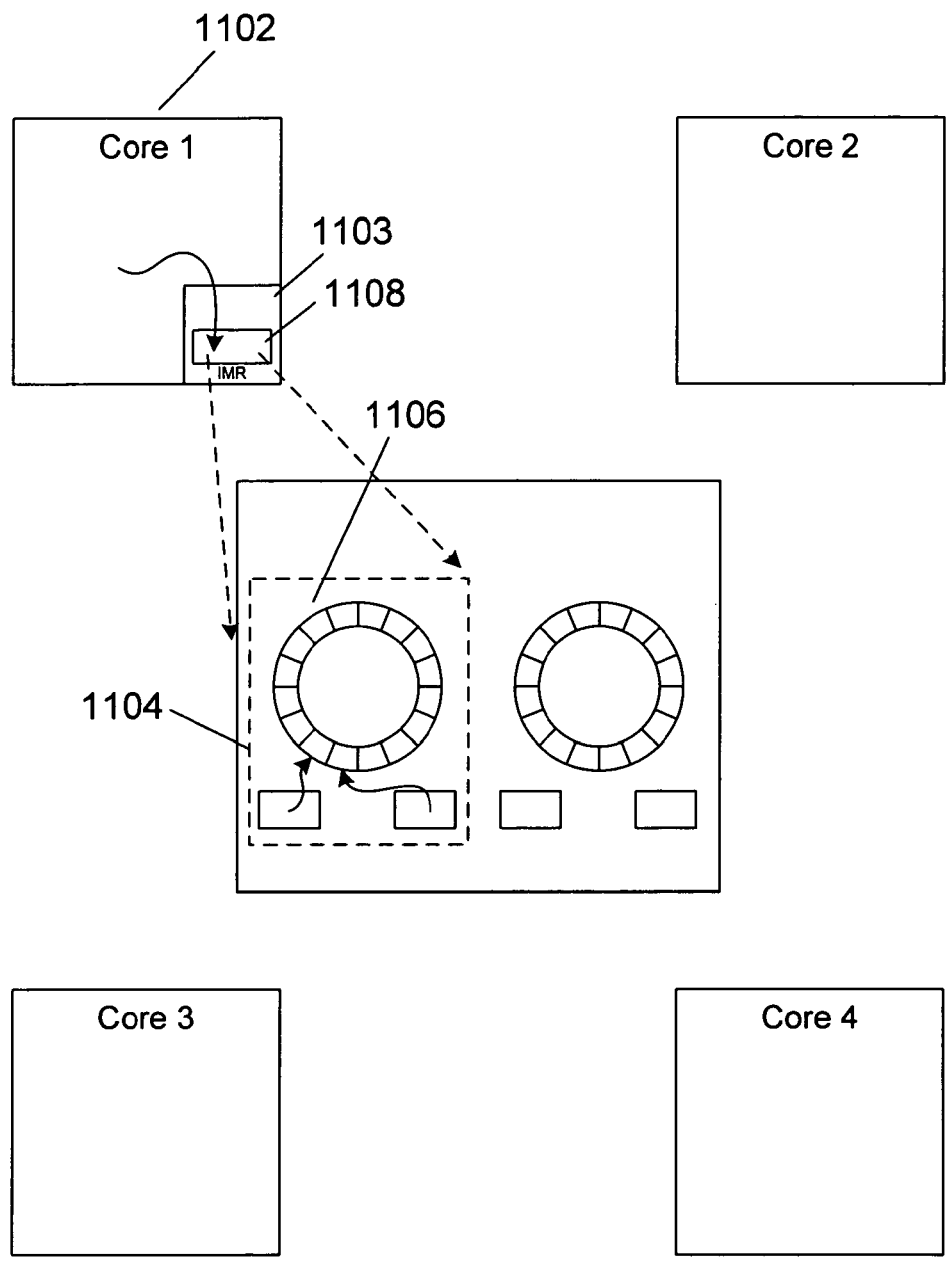
FIGS. 11A-B illustrate one embodiment of the present invention.
Figure 11B:
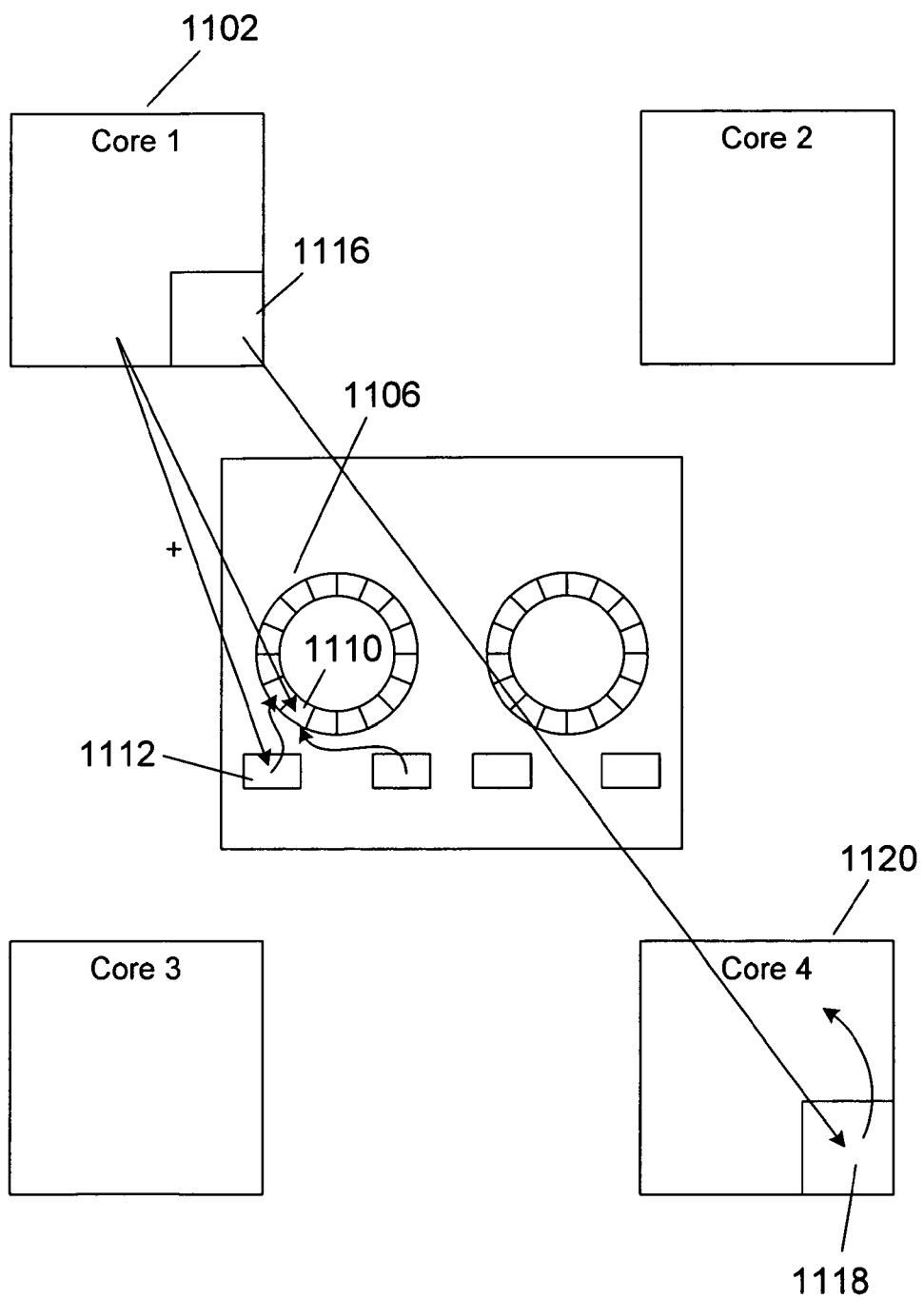

FIGS. 11A-B illustrate one embodiment of the present invention. This embodiment is directed to providing an interrupt-based method by which a program, routine, process, or thread executing on a first core of a multi-core processor can inform one or more programs, routines, processes, or threads executing on one or more target cores that one or more entries have been queued to a FIFO queue for processing by the programs, routines, processes, or threads executing on the one or more target cores. However, this mechanism does not depend on the explicitly directing generation of an IPI by an internal LAPIC within the first core. Instead, the LAPIC can be configured, during initialization of the system, operating system, or low-level communications channels or primitives, to automatically generate an IPI when the containing or associated core issues WRITE operations to a region of shared memory specified during configuration of the LAPIC to automatically generate IPIs.

The described embodiment of the present invention uses a new set of interrupt memory registers ("IMRs") provided by LAPICs that are mapped to shared memory-address space to allow shared-memory regions to be specified, using the IMRs, for automatic IPI generation when WRITE operations are directed to the specified shared-memory regions. Each IMR, in one embodiment of the present invention, is mapped to four 16-byte-aligned memory regions. Thus, in the memory mapping shown in FIG. 6, a first, new IMR register can be mapped to the four, 16-byte-aligned regions shown as dashed lines in FIG. 6 (see 606 in FIG. 6) and having hexadecimal addresses of "FEE0_0400," "FEE0_0410," "FEE0_0420," and "FEE0_0430." Prior to undertaking inter-core communications through a shared-memory-based-communications method, a first core 1102 configures an internal LAPIC 1103 to automatically generate IPIs by writing a description of the memory region 1104 containing a FIFO queue 1106 into an IMR register 1108. By writing this information into the IMR 1108, the first core directs the LAPIC to generate and transmit a specified type of IPI to one or more specified target cores whenever the core issues a memory WRITE operation to the specified region of memory. Thus, for example, whenever the first core queues an entry to the FIFO queue 1106, an IPI is automatically generated by the LAPIC, which monitors WRITE operations directed by the first core to memory. Although the specified region of memory 1104 is shown, in FIG. 11A, to contain both the FIFO-queue slots and the DQ and Q pointers, only that region of shared memory containing the Q pointer or containing the FIFO-queue slots may be specified to the LAPIC for automatic IPI generation, since only one IPI is needed for each enqueue operation, and each enqueue operation generally involves a memory WRITE to both a FIFO-queue slot as well as to the Q pointer.

FIG. 11B illustrates an enqueue operation carried out by the first core 1102 in order to communicate data to a second core 1120. In FIG. 11B, the first core 1102 places an entry 1110 into the FIFO queue 1006 and updates the Q pointer 1112, as discussed above with reference to FIGS. 10A-D. Because placing the entry into the queue involves a WRITE operation to the shared-memory region specified in an IMR, the LAPIC 1116 of the first core 1102 automatically generates an interrupt that is transmitted to the LAPIC 1118 of the second core 1120. Upon receiving the interrupt, the second core then calls an appropriate interrupt handler for retrieving information from the FIFO queue.

Figure 12:
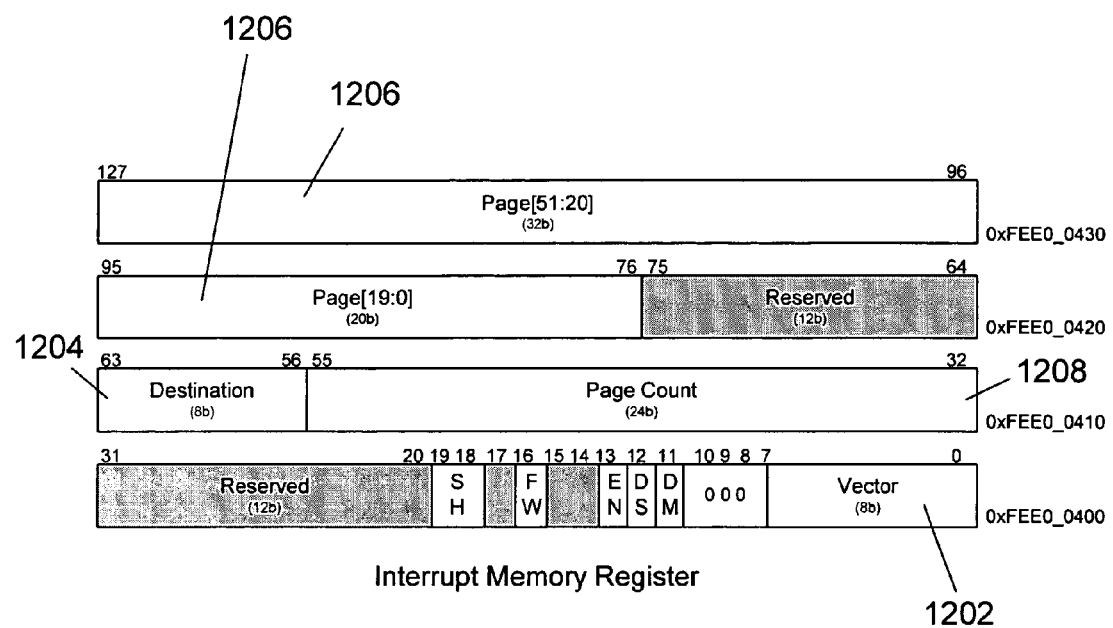
FIG. 12 illustrates a new interrupt memory register included in an enhanced LAPIC according to one embodiment of the present invention.

FIG. 12 illustrates a new interrupt memory register included in an enhanced LAPIC according to one embodiment of the present invention. The IMR register includes fields similar to fields included in the ICR, such as a field 1202 containing the interrupt vector for the IPIs to be generated upon issuance of WRITE operations to a specified memory region. The IMR register also contains a destination field 1204 to indicate to which cores of a multi-core processor the IPI should be transmitted, as in the ICR. In addition, the IMR includes fields that specify a region in shared memory that, when written to, result in automatic generation of an IPI, as discussed above. The field "page" 1206 specifies the address of the first physical-memory page of the shared-memory region, writes to which should automatically generate IPIs, and the field "page count" 1208 indicates the number of fixed-sized pages in the memory region. In one processor architecture in which methods of the present invention are implemented, 4K-byte physical pages are employed, and thus the field "page" has $64-\log_2(4096)=64-12=52$ bits to provide for 64-bit addressing of the first page of a shared-memory region. In alternative embodiments of the present invention, the page field may contain a greater number of bits or fewer bits in order to provide larger-grain or smaller-grain addressing of shared-memory regions.

FIG. 13 provides a description of each of the fields of the new IMR register included in an enhanced LAPIC according to one embodiment of the present invention. The descriptions in FIG. 13 are similar to those found in specifications for the LAPIC registers produced by manufacturers of multi-core processors. The FW (firmware) bit, IMR[16], is used to reserve IMRs for exclusive use by firmware, when set, to avoid the need for controlling contention for IMRs by firmware, operating-system routines, and higher-level processes and threads, should the IMRs be exposed at higher levels. The EN (enable) bit allows for IPI-generation to be toggled off and on, with respect to a shared-memory region defined by an IMR. Additional fields are identical or similar to corresponding ICR fields.

It should be noted that the IMR is intended to allow shared, cacheable write-back memory to be specified for automatic IPI generation. In many operations in which memory is specified, operations are constrained to specifying only uncached memory, to avoid side effects and complexities related to cache-coherency logic. However, embodiments of the present invention are intended to be implemented within processor logic circuits, state machines, and/or firmware, and therefore can interface to cache-coherency and memory-bus components of the processor to ensure that, for example, the cache invalidation cycle is completed for a WRITE operation directed to an automatic-IPI-generating shared memory region before the IPI is issued, to avoid a consumer on a remote core or processor from being alerted to potential new information in a shared-memory region prior to the information being accessible to the consumer.

Figure 14:
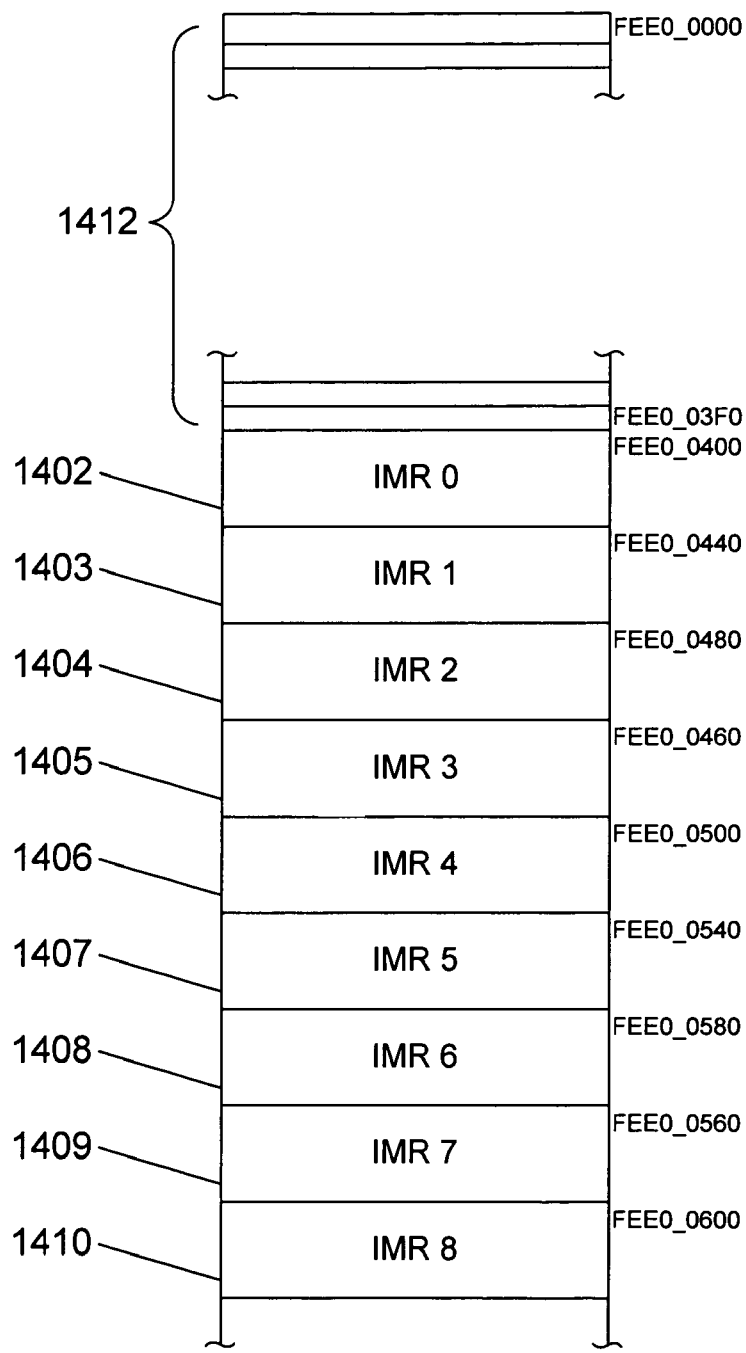
FIG. 14 illustrates that numerous IMR registers may be included in an enhanced LAPIC and mapped to core memory-address space according to embodiments of the present invention.

FIG. 14 illustrates that numerous IMR registers may be included in an enhanced LAPIC and mapped to core memory-address space according to embodiments of the present invention. As shown in FIG. 14, a series of IMR registers 1402-1410 are mapped to sets of four consecutive 16-byte-aligned memory regions following the conventional LAPIC-register mappings 1412.

Figure 15:
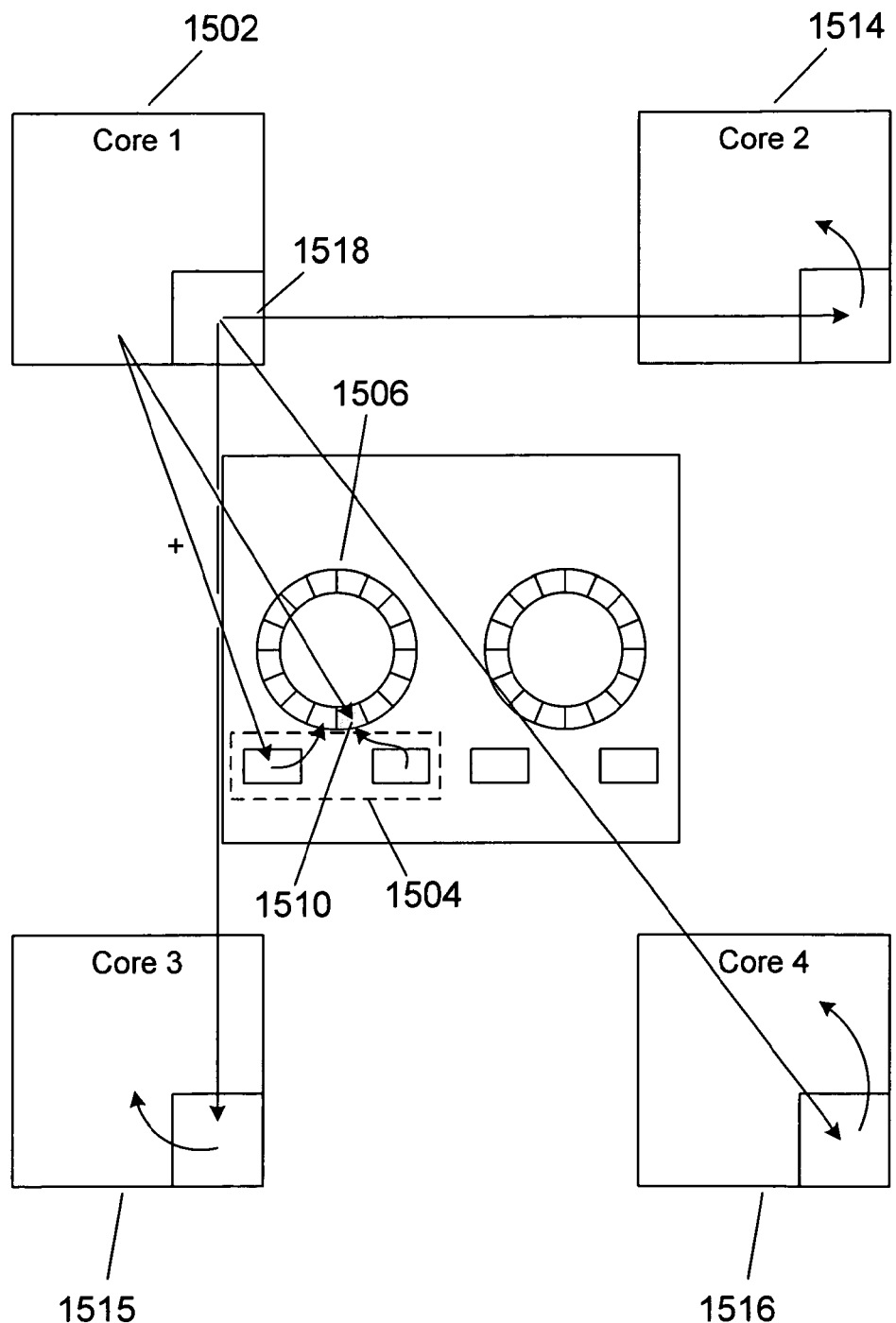
FIG. 15 shows an example of a shared-memory-based communications mechanism in which more than two cores intercommunicate through a common mechanism.

The destination field of the IMR (1204 in FIG. 12) can be used to specify a single core target for an IPI or may contain a multi-cast-address-like specification of multiple cores within a multi-core processor. FIG. 15 shows an example of a shared-memory-based communications mechanism in which more than two cores intercommunicate through a common mechanism. In FIG. 15, a first core 1502 has employed the IMR-based method to configure a region of shared memory 1504 including the DQ and Q pointers of a FIFO queue 1506 for automatic generation of IPIs to multiple cores, according to the described embodiment of the present invention. Thus, when the first core 1502 enqueues a new entry 1510 onto the FIFO queue 1506, all three external cores 1514-1516 are notified by IPI interrupts automatically by the LAPIC 1518 within the first core 1502. In such communications methods, each core receiving the interrupt may need to inspect the newly added queue entries in order to determine whether or not to dequeue and process the entries. Of course, such communications methods involving multiple target cores can be alternatively implemented by a series of two-core shared-memory-based communications mechanisms, such as that illustrated in FIGS. 11A-B.

Although the present invention has been described in terms of particular embodiments, it is not intended that the invention be limited to these embodiments. Modifications within the spirit of the invention will be apparent to those skilled in the art. For example, any number of different formats for the IMR register can be implemented and employed for automatic generation of IPIs upon memory writes to specified regions of memory. The "page" field, for example, may vary in size depending on defined, acceptable page alignments, page sizes, and the size of memory-address space of the processor architecture to which an automatic IPI implementation is directed. The page and page-length fields can be expanded to allow multiple, non-contiguous regions of memory to be specified in a single IMR, although, as defined above, multiple IMRs can be used to define non-contiguous regions of shared memory as a single, automatic-IPI-generating region. Detection of memory WRITE operations to memory regions specified within IMRs can be implemented in various different ways within a processor. In general, the described embodiment of the present invention comprises an enhancement of already-implemented LAPIC functionality—namely the generation of IPIs. Automatic generation of IPIs upon direction of WRITE operations to configured shared-memory regions may be employed to facilitate shared-memory-based communications, as discussed above, but may additionally be employed for other reasons. It should be noted that, when a core or processor writes a value to a special memory region, a cache-invalidation cycle needs to complete prior to generation of the IPI, so that the interrupted core or processor can access the updated memory region, rather than a stale, as-yet-not-updated version of the memory region prior to the WRITE operation that generated the interrupt. Embodiments of the present invention can be incorporated into various types of multi-core processors and various shared-memory multi-processor systems by enhancing various types of LAPIC components incorporated within processors or, alternatively, LAPIC functionality provided by discrete system components.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An inter-processor-interrupt-generation facility within a processor, the inter-processor-interrupt-generation facility comprising:
   one or more interrupt memory registers, each specifying a region within a shared-memory address space, one or more target processors, and an interrupt vector; and
   logic to, when a WRITE operation issued by the processor is directed to a shared-memory region specified by a particular interrupt memory register, generate an inter-processor-interrupt, of an interrupt type specified by the interrupt vector included in the particular interrupt memory register, directed to the one or more target processors specified in the particular interrupt memory register, wherein the logic is to generate the inter-processor-interrupt after completion of a cache-invalidation cycle related to the shared-memory region specified by the particular interrupt memory register.

2. The inter-processor-interrupt-generation facility of claim 1 included in one or more of: each processor of a shared-memory multi-processor computer system; and each core of a multi-core processor.

3. The inter-processor-interrupt-generation facility of claim 1 wherein shared-memory regions may be specified for automatic inter-processor-interrupt generation in one or more of:
   uncached shared memory;
   cached shared memory;
   write-through cached shared memory; and
   write-back cached shared memory.

4. The inter-processor-interrupt-generation facility of claim 1 wherein each of the one or more interrupt memory registers includes:
   a vector field that contains an interrupt vector characterizing an inter-processor interrupt to be generated;
   a fixed-deliver-mode field;
   a destination-mode field;
   an enable field, controlling whether or not an inter-processor interrupt is generated upon a WRITE directed to the shared-memory region specified by the interrupt memory register;
   a firmware field that specifies whether or not the interrupt memory register is available for use by a host operating system, hypervisor, or other non-firmware entity;
   a destination-shorthand field that provides for various broadcast-like targeting modes;

a page-count field that specifies the number of consecutive pages within the shared-memory region specified by the interrupt memory register;

a destination field that specifies the processor target for inter-processor interrupts generated as a result of WRITE operations directed to the shared-memory region specified by the interrupt memory register; and a page field that contains the physical page address of the first page of the hared-memory region specified by the interrupt memory register.

5. The inter-processor-interrupt-generation facility of claim 1 wherein the interrupt memory registers are mapped to processor memory-address space to allow a routine, thread, process, or program executing on the processor to read values from the interrupt memory registers and to write values to the interrupt memory registers.

6. The inter-processor-interrupt-generation facility of claim 1, wherein the processor is to use the inter-processor-interrupt-generation facility to communicate with a consumer processor by writing data to the shared-memory region specified by the particular interrupt memory register in order to transfer the data to the consumer processor and to alert the consumer processor that the data is available in the shared-memory region.

7. The inter-processor-interrupt-generation facility of claim 6 wherein the shared-memory region includes a FIFO queue to which the processor enqueues an entry and from which the consumer processor dequeues the entry.

8. The inter-processor-interrupt-generation facility of claim 1 wherein the inter-processor-interrupt-generation facility is implemented within a local advanced programmable interrupt controller.

9. A method for communicating between a plurality of processors, the method comprising:
providing, in each processor of the plurality of processors, one or more interrupt memory registers, each of the one or more interrupt memory registers uniquely specifying a region within a shared-memory address space, one or more target processors of the plurality of processors, and an interrupt vector; and
when a WRITE operation issued by a particular processor is directed to a particular shared-memory region specified by a particular interrupt memory register included in the particular processor, generating an inter-processor-interrupt of an interrupt type specified by the interrupt vector included in the particular interrupt memory register, the inter-processor-interrupt directed to the one or more target processors specified in the particular interrupt memory register, wherein generating the inter-processor-interrupt is performed after completion of a cache-invalidation cycle related to the particular shared-memory region specified by the particular interrupt memory register.

10. The method of claim 9 wherein the plurality of processors are one or more of:
processors of a shared-memory multi-processor computer system; and
cores of a multi-core processor.

11. The method of claim 9 wherein shared-memory regions may be specified for automatic inter-processor-interrupt generation in one or more of:
uncached shared memory;
cached shared memory;
write-through cached shared memory; and
write-back cached shared memory.

12. The method of claim 9 wherein each interrupt memory register of the one or more interrupt memory registers includes:
a vector field that contains an interrupt vector characterizing an inter-processor interrupt to be generated;
a fixed-deliver-mode field;
a destination-mode field;
an enable field, controlling whether or not an inter-processor interrupt is generated upon a WRITE directed to the shared-memory region specified by the interrupt memory register;
a firmware field that specifies whether or not the interrupt memory register is available for use by a host operating system, hypervisor, or other non-firmware entity;
a destination-shorthand field that provides for various broadcast-like targeting modes;
a page-count field that specifies the number of consecutive pages within the shared-memory region specified by the interrupt memory register;
a destination field that specifies the processor target for inter-processor interrupts generated as a result of WRITE operations directed to the shared-memory region specified by the interrupt memory register; and
a page field that contains the physical page address of the first page of the hared-memory region specified by the interrupt memory register.

13. The method of claim 9 further comprising mapping the one or more interrupt memory registers to processor memory-address space to allow a routine, thread, process, or program executing on the processor to read values from the interrupt memory registers and to write values to the interrupt memory registers.

14. The method of claim 9 wherein the particular shared-memory region includes a FIFO queue to which the particular processor enqueues an entry and from which one of the one or more target processors dequeues the entry.

15. The method of claim 9, further comprising:
initializing, by a first processor of the processors, a first interrupt memory register to specify a first region of memory shared by the processors for automatic interrupt generation; and
writing, by the first processor, data to the first region of memory specified by the initialized first interrupt memory register.

* * * * *

UNITED STATES PATENT AND TRADEMARK OFFICE
CERTIFICATE OF CORRECTION

| | | |
|---|---|---|
| PATENT NO. | : 9,032,128 B2 | Page 1 of 1 |
| APPLICATION NO. | : 12/988459 | |
| DATED | : May 12, 2015 | |
| INVENTOR(S) | : Thomas J. Bonola | |

It is certified that error appears in the above-identified patent and that said Letters Patent is hereby corrected as shown below:

Drawings

In sheet 8 of 19, reference numeral 802, line 1, delete "DEUCE" and insert -- DEVICE --, therefor.

Claims

In column 14, line 46, in Claim 3, delete "interrupt generation" and insert -- interrupt-generation --, therefor.

In column 16, lines 5-6, in Claim 11, delete "interrupt generation" and insert -- interrupt-generation --, therefor.

Signed and Sealed this
Fifteenth Day of December, 2015

Michelle K. Lee
*Director of the United States Patent and Trademark Office*